United States Patent [19]

Babin et al.

[11] Patent Number: 5,945,985
[45] Date of Patent: Aug. 31, 1999

[54] INFORMATION SYSTEM FOR INTERACTIVE ACCESS TO GEOGRAPHIC INFORMATION

[75] Inventors: Shane P. Babin, Gretna, La.; Kenneth C. Barnett, Alabaster, Ala.; Abdo A. Husseiny, LaPlace, La.

[73] Assignee: Technology International, Inc., Laplace, La.

[21] Appl. No.: 08/650,838

[22] Filed: May 20, 1996

Related U.S. Application Data

[63] Continuation-in-part of application No. 08/448,112, May 22, 1995, Pat. No. 5,519,809, which is a continuation of application No. 07/966,830, Oct. 27, 1992, abandoned.

[51] Int. Cl.[6] .................................................. G06F 17/28
[52] U.S. Cl. ............................................................ 345/302
[58] Field of Search ..................................... 345/302, 333, 345/336, 339; 434/132, 133, 153; 704/274, 275, 253

[56] References Cited

U.S. PATENT DOCUMENTS

| | | | |
|---|---|---|---|
| 2,957,252 | 10/1960 | Pain | 434/132 |
| 3,736,411 | 5/1973 | Berndy | 345/133 |
| 3,974,577 | 8/1976 | Brachlianoff | 434/136 |
| 4,276,561 | 6/1981 | Friedman | 358/524 |
| 4,334,867 | 6/1982 | Friedman | 434/145 |
| 4,449,941 | 5/1984 | McGuire et al. | 434/153 |
| 4,451,874 | 5/1984 | Friedman | 362/285 |
| 4,473,950 | 6/1990 | Isle et al. | 33/605 |
| 4,569,019 | 2/1986 | DiOrio et al. | 463/31 |
| 4,593,403 | 6/1986 | Kishi et al. | 704/243 |
| 4,638,451 | 1/1987 | Hester et al. | 395/883 |
| 4,641,342 | 2/1987 | Watanabe et al. | 704/253 |
| 4,677,569 | 6/1987 | Nakano et al. | 704/275 |
| 4,713,766 | 12/1987 | Kobayashi et al. | 701/103 |
| 4,717,364 | 1/1988 | Furukawa | 446/175 |
| 4,725,956 | 2/1988 | Jenkins | 701/2 |
| 4,742,456 | 5/1988 | Kamena | 364/400 |
| 4,757,542 | 7/1988 | Neahr, II et al. | 704/274 |
| 4,766,529 | 8/1988 | Nakano et al. | 704/275 |
| 4,776,016 | 10/1988 | Hansen | 704/275 |
| 4,785,408 | 11/1988 | Britton et al. | 704/270 |
| 4,797,924 | 1/1989 | Schnars et al. | 704/275 |
| 4,797,927 | 1/1989 | Schaire | 704/252 |
| 4,907,274 | 3/1990 | Nomura et al. | 380/30 |
| 4,941,082 | 7/1990 | Pailthorp et al. | 364/167.03 |
| 4,978,302 | 12/1990 | Clossey | 434/153 |
| 5,024,523 | 6/1991 | Jerie | 353/11 |
| 5,030,100 | 7/1991 | Hilderman | 434/132 |
| 5,030,117 | 7/1991 | Delorme | 434/130 |
| 5,050,056 | 9/1991 | Ellison | 362/300 |
| 5,057,024 | 10/1991 | Sprutt et al. | 434/132 |
| 5,115,399 | 5/1992 | Nimura et al. | 701/208 |
| 5,161,886 | 11/1992 | De Jong et al. | 701/209 |
| 5,197,007 | 3/1993 | Hoffman, Jr. et al. | 701/49 |
| 5,226,725 | 7/1993 | Trusiani | 362/351 |
| 5,324,224 | 6/1994 | Anderson et al. | 446/91 |
| 5,344,325 | 9/1994 | Wang | 434/288 |
| 5,519,809 | 5/1996 | Husseiny et al. | 704/275 |
| 5,561,756 | 10/1996 | Miller et al. | 345/326 |
| 5,703,604 | 12/1997 | McCutchen | 345/8 |

*Primary Examiner*—Stephen S. Hong
*Attorney, Agent, or Firm*—Sixbey, Friedman Leedom & Ferguson; Donald R. Studebaker

[57] ABSTRACT

An interactive multimedia geographic system is disclosed which incorporates an animated three-dimensional solid model of a world globe and utilizes video, sound, graphics, images and numerical presentations for perspective display of detailed maps of the world or portions of the maps. The system is capable of generating desired regional, global, political, and other maps detailing information on various geographic related features, such as demographic, cartographic, topographic, and geomagnetic features of the world. The system is coordinated with a physical globe which highlights the region of interest, and maintains a sense of perspective and relations among geographical regions as the display of the world model changes to reveal further details.

14 Claims, 21 Drawing Sheets

INFORMATION SYSTEM FOR INTERACTIVE ACCESS TO GEOGRAPHIC INFORMATION

This application is a continuation-in-part of U.S. patent application Ser. No. 08/448,112, filed May 22, 1995, (now issued as U.S. Pat. No. 5,519,809) which is a continuation of U.S. patent application Ser. No. 07/966,830 filed Oct. 27, 1992 (now abandoned).

FIELD OF INVENTION

The present invention relates generally to a system for acquisition of geographic information involving the use of an animated three-dimensional solid model of a world globe immersed into an interactive multimedia environment utilizing video, sound, graphics, images and numerical presentations for perspective display of detailed maps of the world or portions of the maps. More specifically, the present invention is directed to an apparatus for and a method of exploring geographic features of the world at various levels of details from a continent to an object in a small town and to acquiring different types of geographic knowledge including, but not limited to, display of multimedia information and data on the economy, commerce, political boundaries, historical landmarks, natural resources, and environment for any specific portion of the world within the context of the world.

BACKGROUND OF THE INVENTION

Multimedia has now become the wave of the future and many applications are being developed to tap into this thriving innovative concept which allows a user to interact with her personal computer. Due to the overwhelming capabilities of multimedia, users are able to experience life-like games, enhanced communications capabilities, and a myriad of other applications which have all benefitted by the advancement of multimedia. The inventor of the present invention has recognized the educational opportunities which may be realized with the use of multimedia in a novel and innovative way. In particular, the present inventor has recognized that through the use of multimedia, a user may effectively learn about the geographical makeup of the world, as well as, each country, state, city or town as viewed from the world.

The prior art teaches various methods of using a computer-controlled globe to aid in the teaching a geographical information. In U.S. Pat. No. 5,057,024, a computerized illuminated globe almanac system is disclosed for rotating the globe to a selected viewing position and illuminating selected points, lines and areas on the globe. Rotation is accomplished by a computer-controlled stepper motor. Illumination of major geographic features is done by insertion of light emitting diodes (LED's) on the interior surface of the globe. The system also displays almanac-type information such as, for example, city or country name and population, river name and length, etc. However, systems such as the one disclosed in '024 do not involve accessing the system by voice, the use of three-dimensional model for display on a computer monitor, and does not provide tools for generation of detailed maps about selected portions of the world map. Also, the available information is limited to major features and major cities.

One prior art reference discloses more detailed features and characteristics which relate to the different regions of the world. U.S. Pat. No. 5,030,100 relates to an environmental display system wherein temporal computer generated patterns of environmental phenomena, such as holes in the ozone layer, fallout from a nuclear accident, etc., which vary with time and space are projected on the surface of a physical globe or an earth map representing portions of the earth by the use of optical fibers. The system allows for illumination of certain portions of the globe and the variation of displays on the globe. However, the limitation of the system does not allow for detailed study of the geography of different portions of the earth or exploration of geographic topics of interest.

In spite of the availability of various types of computer-controlled globes, computer-generated maps, and geographic information systems, the inventor has recognized a need still exists for a dynamic geographic representation which would provide perspective on the relationship between microscopic data on certain locality and global data on the world as a whole or macroscopic data on a wide area surrounding the specified locality including neighboring regions. This is important in the study of various aspects of geography and is becoming of special interest due to the emergence of a global economy, the decline in resources, and the increase of the impact of world affairs on the state of every entity in the world.

The ability to walk through a virtual world and explore various information about specific areas around the world would be of interest in learning more about the world or about specific regions of the world, whether in general or in relationship to specific areas of interest. This capability is invaluable for an individual interested in travelling to a specific part of the world, performing research on a specific topic in relationship to a specific geographical territory, learning about other countries, etc. Such needs can be met by a system similar to that disclosed here wherein the capability to access information about specific geographic region is provided in the context of a world geographic system. This is enhanced by the ability to navigate through maps starting from a general view to focusing on more details.

Further enhancements to existing computer-controlled geographic learning aids which provide for a more versatile geographical system are noted in U.S. Pat. No. 5,115,399 which discloses a position input system which displays a map and a requested location on the map comprising a voice input means. The maps can provide details down to intersections of streets and landmarks. However, the system is limited to specific locations without providing information relating a particular area to other neighboring areas or to the world geography.

Several other patents show different methods for illumination of various regions of a map, provide different rotation mechanisms for a globe, and emphasize various representations of special geographic features. For example, U.S. Pat. No. 5,226,725 shows an illuminated map device consisting of a hollow flat or spherical housing, with a map extending over at least a part of its outer surface representing at least some of the topographical features of the earth; U.S. Pat. No. 5,024,523 provides a map projection system using slides; U.S. Pat. No. 4,978,302 describes a computer program for teaching land mass recognition comprising generating a visual display of a geographic feature with respect to a map, user selection of a name for the displayed geographic feature, and indicating the correctness of the user selection; U.S. Pat. No. 3,974,577 presents an arrangement for rotating a spherical object such as a world globe around a virtual axis orientable at will; while U.S. Pat. No. 2,957,252 discloses a mechanism for rotating a massive globe around two axes; and U.S. Pat. No. 4,449,941 uses an educational device for geographical names and locations, wherein areas of interest are externally illuminated by battery-powered lamps actuated by insertion of cartridges, however the device is limited to the map of a country or a region of a country.

None of the references cited above provide a dynamic multimedia system utilizing animation and three-dimensional solid models to allow the viewer to explore different perspectives of a world globe or to acquire an overall as well as specific knowledge of different aspects of geography within the context of the whole earth as one unit.

In particular, current technology as disclosed in the noted prior art do not allow the user of the computerized geographical system to display a world map and gradually move on closer to select portions of the globe to acquire magnified and enhanced regional maps, and zoom in objects on the map which are represented by points to access street maps and locate objects of interest. The inventor has recognized the need to represent detailed maps or location of a geographic feature within a continent or a country without losing perspective on the relationship between a point, a line or a region on a map and the rest of the world globe. Maintaining visual perception of a geographic location in relationship to the global picture at all times promotes cognitive learning, for example, of the interactiveness of the physical, political, economical, geological, and environmental states of the world. This would allow the user the visualization of the interrelationships between all aspects of world geography, state of economy, and natural resources for example.

A further enhancement to existing computerized geographical systems includes the use of voice as an input or output means. The inventor has recognized the advantages of having an interactive speech system that would free the hands of the user while accessing the computerized geographical system. This capability is useful in allowing the user to consult other references such as books and documents while exploring graphical and other multimedia information. The system would be also compatible with users having a disability that may restrict the use of their limbs.

Users will benefit from the dynamic nature of the apparatus, ranging from the voice interaction capability to the graphics and animation used to simulate the earth and represent important information about various features, such as countries, bodies of water, states or provinces, cities, and landmarks or places of interest. Moreover, the use of a geographical navigation system can be the basis for an educational game that combines learning with entertainment.

SUMMARY OF THE INVENTION

A general object of the present invention is to provide a novel and improved multimedia system for visualization of a specified geographical feature and for access to related geographical information by navigation through an animated virtual world map, possibly combined with a physical world globe.

It is a further object of the present invention to provide a novel method for relating geographic information on a specified location to the global geographical state.

It is yet another object of the present invention to provide a novel and improved system for remote access of geographic multimedia information in national and international resources.

It is also another object of the present invention to provide a novel flexible geographic system for easy updating of maps as new information becomes available.

It is another further object of the present invention to provide a novel system for accessing information on geographic topics through video, three-dimensional graphical models, maps and physical models.

It is yet another object of the present invention to provide a novel and improved system for highlighting specified geographic features on a physical map.

It is a further object of the present invention to provide a novel and improved system for highlighting specified geographic features on a virtual rendering of geographic maps on a display.

It is yet a further object of the present invention to provide a novel method for learning physical, population, economical, and political geography, as well as other aspects of geography including topography, demography, distribution of natural resources, etc. through computer-generated graphical models and maps.

It is further object of the present invention to provide a novel and improved method for learning different topics of geography through interactive sessions on a computer platform through a multimedia system coordinating various input and output elements and incorporating a combination of speech recognition, digitized and synthesized voice, animation, sounds, graphics, text and three-dimensional images, etc.

It is another object of the present invention to provide a novel and improved system to promote learning through interactivity, utilizing various human computer interfaces, particularly voice interaction, to allow the user to freely "navigate" through a model of a world globe to view particular locations and access information related to such locations.

It is also another object of the present invention to provide a novel system to ease access to multimedia geographical information through interactivity by voice to allow the user the freedom to "navigate" through a world globe to view a particular location by merely speaking a few words without restricting the user's hands.

It is further an object of the present invention to provide a novel system to allow individuals with disabilities easy access of multimedia geographical information by merely speaking a few command words to view a particular location on a world globe or on specified area maps and to acquire information through speech.

Other objects of the invention will become apparent to those skilled in the art upon review of the specification and drawings in conjunction with the claims.

The present invention broadly relates to a computer-aided geographic system that uses various human-computer interfaces to prompt specific displays and outputs, and to navigate through such displays to access appropriate information utilizing solid models and multimedia tools. Another aspect of the invention uses voice to interactively affect inputs, control displays and outputs, and access geographic information of interest.

In a preferred embodiment, in response to issuing an audible command requesting the view of a geographical region and/or city, a three-dimensional graphic display of the world globe would rotate around an axis to expose and highlight the region being requested for direct view, and simultaneously rotate a physical world globe so that spot lights and area lights would illuminate the globe and highlight the city or the region being requested for direct view. As a guide for issuing vocal commands, a list of options would be displayed on the display screen, including proper phonetics for pronouncing the instruction. Subsequent commands will result in display and output of related information in the form of graphical displays, maps, data, text, video from a video player or a video camera, still photographs, sound, etc., which can be presented in sequence, as overlays, or on different portions of the screen of a computer monitor. This is in addition to narrations of displayed information by synthesized voice. Such information would include economic, demographic, topographic or other information of interest to the user. Starting from the view of the virtual world globe on the screen, the user can zoom on a region of interest using voice commands to prompt the display of enlarged maps, magnified scenes of points of interest, and other images relating to the locations of interest, without losing the indication of the location of the region or city relative to the world map as provided by the physical globe. This embodiment enables a user to zoom in on any location without the need to specify every step in the sequence leading to evoking particular details on that location. For example, to zoom in on New Orleans, one need not specify that the view should go from the global view, to the view of the United States, to Louisiana, and then to New Orleans. Instead, the user simply says the word New Orleans and the view would automatically begin zooming in until the required level of detail is achieved. In the case wherein there is more than one location for a given phrase or name, a list of possibilities appears to choose from.

In another aspect of the preferred embodiment, other input devices (such as a mouse, a trackball, a joystick, a touch-screen interface, or a keyboard) are used to activate menus, pushbuttons, and list boxes. Through input actions, the image of the world changes by a combination of rotation and panning of the image, which makes it appear as though the user is changing their perspective of the globe; zooming, in which the scale of the image changes and the details change; and transitions, as new images are displayed to focus on specific details or attractions.

In a different embodiment, navigation about the globe (changing the display to show places, attractions, and other details) is accomplished by a combination of a control yoke, footpedals, a joystick or a trackball, and appropriate gages for identification of location within the scene. In this embodiment, the user can effectively steer through a virtual world by using the controls in much the same way as one would control a vehicle, such as an aircraft. The controls would allow the user to zoom in or out, pan across the display, and select specific items of interest to effectively move freely around the world to explore locations and attractions. In one aspect of this navigation system, the processor, a monitor display with windowing capabilities, the global model, and all control devices are combined in one unit.

The invention provides a system to remedy the lacking ability to access geographic information on specified areas while keeping track of the relationship with other areas in the global context. For example, highlighting the area of New Orleans for detailed investigation is done without loosing perspective on relationship with the state, neighboring states, the United States, the continent of North America and the rest of the world. In one of the embodiments, the ability to communicate with other locations in the world is also provided.

In addition, the invention allows the use of multimedia capability for clear visualization of geographic features of maps and associated information and data in graphic and textual forms.

DETAILED DESCRIPTION OF THE PREFERRED EMBODIMENTS

The present invention is a significant enhancement of the basic interactive geographic system disclosed in copending U.S. patent application Ser. No. 07/966,830, naming common inventors, the entire disclosure of which is incorporated herein by reference.

Figure 1:
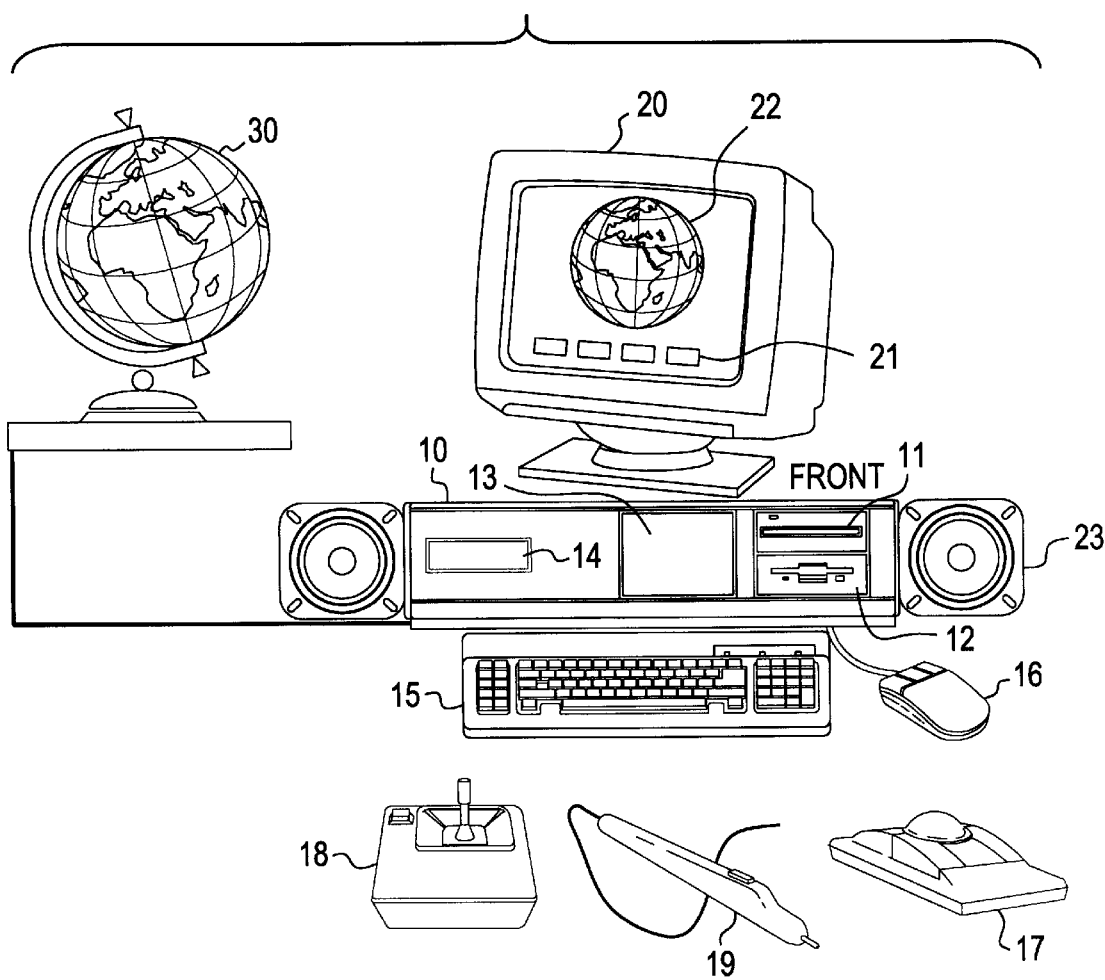
FIG. 1 is a simplified schematic representation of one aspect of the interactive globe/geographic multimedia system showing various components of the system.

A schematic diagram is shown in FIG. 1 of a preferred arrangement of the physical components of the interactive multimedia globe/geographic system of the present invention. The heart of the system is a computer platform 10 (shown from the front end), preferably an IBM-compatible personal computer (PC) system having a microprocessor in the Intel 80×86 or Pentium series. The computer platform must have sufficient random-access memory (RAM) and read-only memory (ROM). ROM-based systems such as those employing gaming cartridges (Sega and Nintendo for example) may be used. Electronic storage means, such as magnetic hard disk drives, magneto-optical drives, or CD-ROM drives are preferred as electronic storage and retrieval devices for PC applications. If a PC is used, a Pentium is preferred; however, an 80486 microprocessor or RISC processor may be used along with at least a forty (40) megabyte hard disk and eight (8) megabytes of RAM.

The interactive multimedia globe/geographic system can also be appropriately implemented using several other types of computer platforms or workstations, for example MacIntosh by Apple, VME board by Motorola, Silicon Graphic workstation by SGI, SUN workstation, gaming devices, or any other platform. In fact, the system preferably uses algorithms that are portable in the sense of being appropriate for use in most computer operation environments.

The computer 10 should have at internal slots for add-on cards (not shown) and several parallel and serial connections for input devices, display devices, and ancillary and auxiliary devices. This is in addition to a drive for a compact disc (CD) read only memory (CD-ROM) 11 and a floppy diskette drive 12. The CD-ROM drive may be replaced by a write-once read-many (WORM) drive or any other optical multimedia storage devices. The space 13 allows for the installation of additional storage devices. Item 14 includes a power on-and-off button and status displays.

A keyboard 15 is shown in FIG. 1, as an input device to input user's instructions and enter additional data. Also, a mouse 16 is used as a pointing input device for manipulating windows, cursors, and menus and activating control pushbuttons 21 on the screen of the computer monitor 20.

An assortment of input devices may be used in place of the mouse 16, including pointing devices such as a trackball 17, a joystick 18, or a light pen 19. Other human-computer interfaces may be used in place of pointing devices, such as a touch screen through which tactile input at specific locations can affect selection of commands and controls. Other specialized hardware controls may be used, such as data gloves used in virtual reality applications and in some video games.

The monitor 20 is a high resolution monitor which can be a VGA or Super VGA monitor. Stereoscopic, panoramic and/or touchscreen monitors are preferred. The screen of the monitor 20 is used for display of an overall view of a simulated world virtual globe 22, maps, graphics, images, text, and a set of control pushbuttons 21 to activate menus and list boxes.

The simulated world globe 22 is an animated three-dimensional solid geometrical model of the earth, that mimics a physical globe and renders a detailed world map in color or in shades of gray, showing political boundaries and significant geographical features.

Animation allows the user to rotate the virtual globe 22 about the longitudinal axis, pan up and down across the model, and highlight selected areas on the surface for varying periods of time.

Selected areas or points can be highlighted on the virtual globe for contrast with other parts of the world map. Colors are preferred for distinguishing areas or points of interest from background areas. The highlighting colors should not conflict with the natural colors used for rendering the world maps; that is colors used for distinguishing between water, land terrains, forest, political borders, etc. Alternatively, different shades of gray are appropriate for highlighting, using darker shades and points to emphasize objects of interest while using faded shades of gray for background areas without losing details of the world map.

The three-dimensional image of the virtual globe 22 is constructed by mapping the earth from its spherical coordinate representation to the two dimensional display. The image of the virtual globe is defined by a "camera" view. The contents and details displayed are determined by the coordinates of the camera. With respect to spherical coordinates, the overhead position (typically determined by degrees of latitude and degrees of longitude) is designated by the two angles theta and phi, with theta being the angle from the north pole and phi being the angle with respect to 0 degree longitude moving east. The zoom factor, which determines the display content and detail level, is identified by the radius of the "camera" position in spherical coordinates. In this way, continuity of zooming and transitions are achieved by defining the ranges for various detail levels associated with zooming. Typically maps are stored electronically as images which include details such as borders and terrain.

In order to provide for a flexible simulation that can be updated as information on political boundaries of countries or territories changes, boundaries are defined and stored by the computer as mathematical functions, which are in effect overlaid onto the model of the globe. In this way, when a set of political boundaries change, the entire set of images comprising the world map need not be changed, but only the function which represents the borders needs to be updated.

Connected to the computer platform 10 is a motorized, rotatable, illuminated physical globe 30, which is a modification of manually operated globes, such as that manufactured by Scanglobe. The physical world globe is used simultaneously with the virtual world globe and the associated maps. As points of interest are displayed on the virtual globe display, the physical globe rotates in synchronization with the displayed globe, highlighting points of interest corresponding to those shown in the screen.

A set of loudspeakers 23 is included for output of audio components (including synthesized voice and recorded voice or sounds) stored on the CD-ROM or other storage device and relating to the geographic information being displayed. As an optional feature, a voice synthesizer (typically incorporated into the computer or sound card) can be used to produce synthesized voice for special presentation of geographic information or data related to the graphical displays of geographical maps.

In addition, other conventional components (not shown) are provided such as power supplies and amplifiers.

Figure 2:
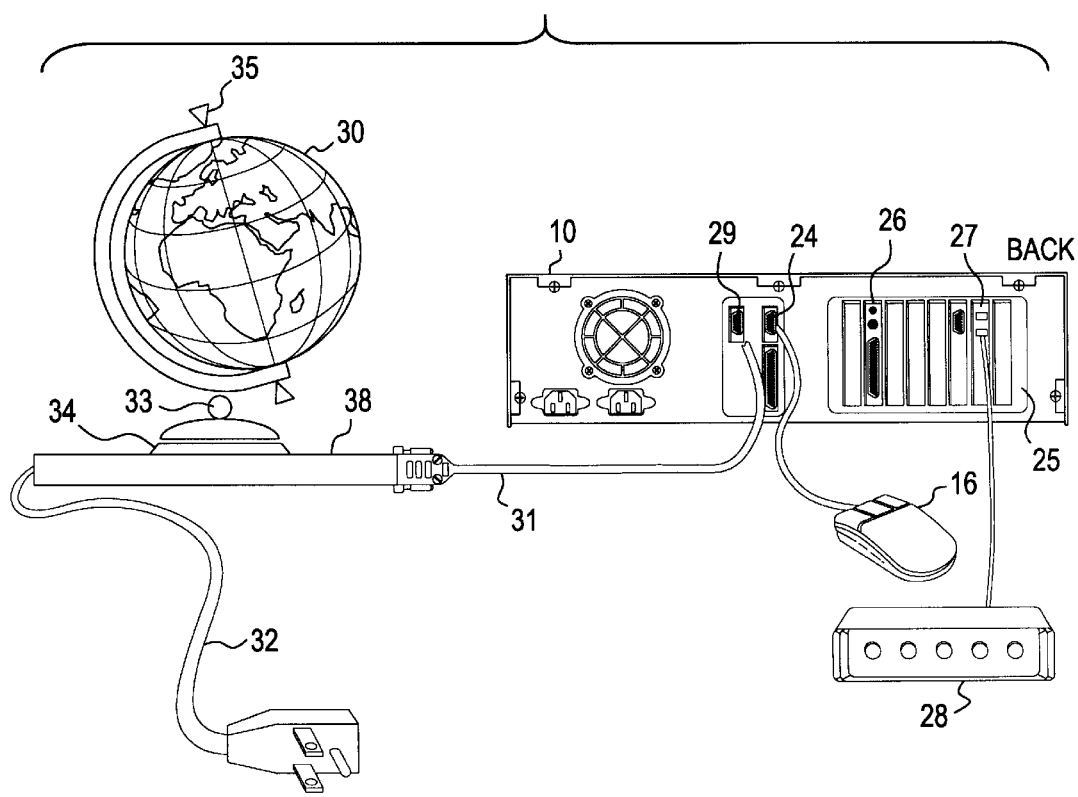
FIG. 2 shows the back end of the computer component of the system schematic of FIG. 1 indicating connections to some components of the system.

A schematic of the back of the computer 10 is given in FIG. 2, showing the connection 24 of the mouse 16 and access 25 to the internal slots reserved for different operation add-on cards or chips to be integrated with the system to provide additional capabilities, such as analog-to-digital (A/D) converter and/or digital signal processing (DSP) hardware 26 for digitizing and processing analog input data, or a digital-to-analog (D/A) converter (not shown) for processing output analog signals. Access 25 also includes connection 27 of a modem 28 for communication with other systems through wide area networks, connection 29 for the physical globe 30.

The motorized globe 30 is linked by a connecting cable 31 to the computer's peripheral port 29. Control signals are transmitted from the processor 10 through the cable 31 to affect rotation of the physical globe 30 and localization of the partial illumination of areas or points of interest on the physical globe 30. Cable 31 connects to a powered Globe platform 38 which receives control signals from processor 10 and provides power to the step motor 33 to effectuate the movement of globe 30. The linking hardware may be replaced by an infrared or radio frequency (RF) transmitter for wireless connection.

The physical globe may be powered by a battery or through main power supply using electric cord 32.

A step motor 33 at the base 34 of the globe causes rotation of the globe about the longitudinal axis 35 for direct view by the user in response to a control signal defining a specified degree of longitude coordinate of the selected geographic point of interest.

Figure 3:
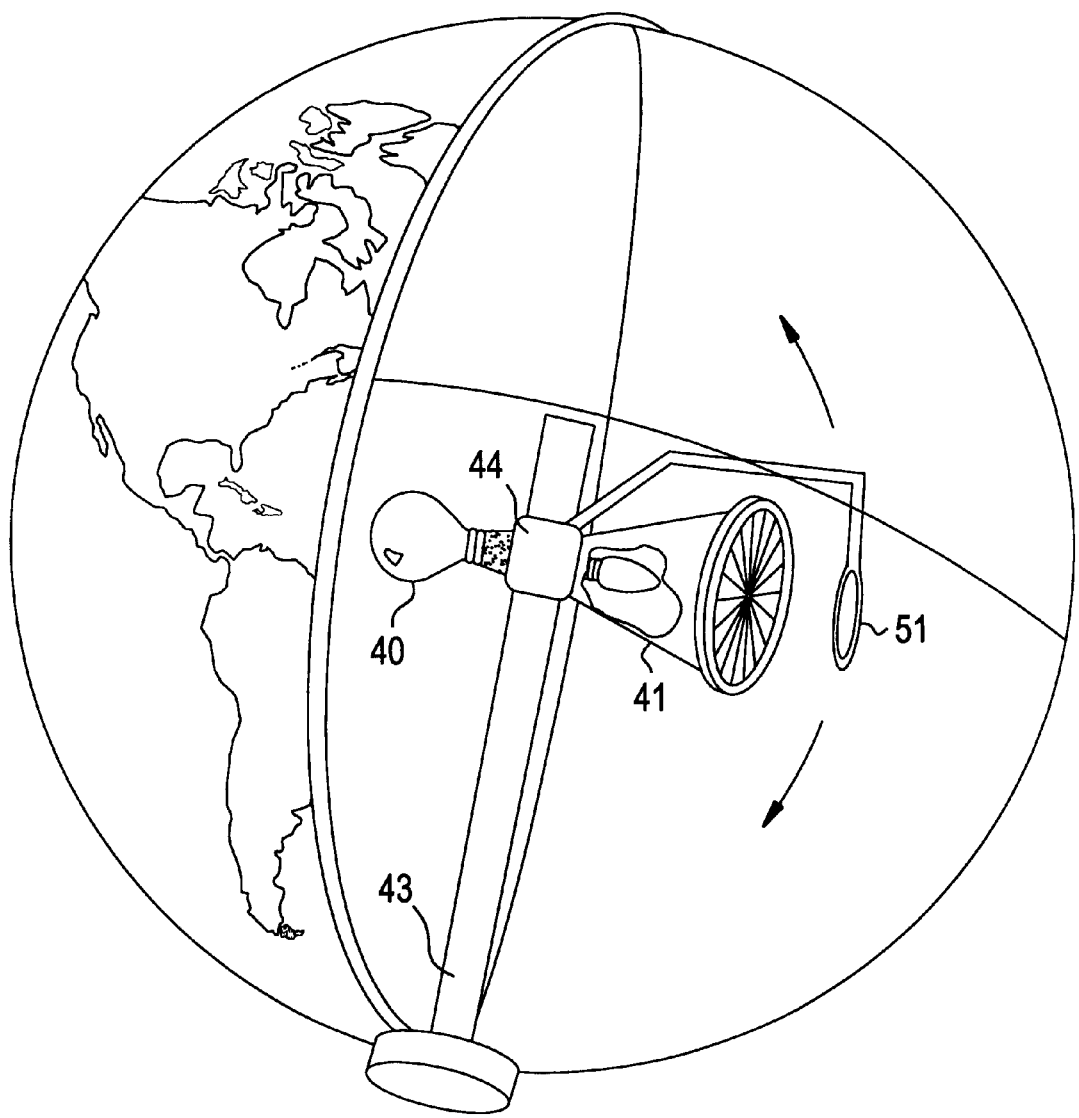
FIG. 3 shows the lighting mechanism for illumination and highlighting of the physical globe shown in FIG. 2.

The physical globe is equipped with built-in permanent fade light source 40 in the interior of the globe, as shown in FIG. 3, capable of illuminating the whole interior of the globe for clear display. Also, a focused light beam source 41 or other light beam pointers are used to highlight a place of interest. A control signal transmitted through cable 42, as shown in FIG. 4a, affects the rotation of the light sources connected to the arm 43, shown in FIG. 3, in a semicircle about the latitudinal axis by a second step motor 44 to the degrees of latitude coordinate of the selected geographic point of interest.

Figure 4A:
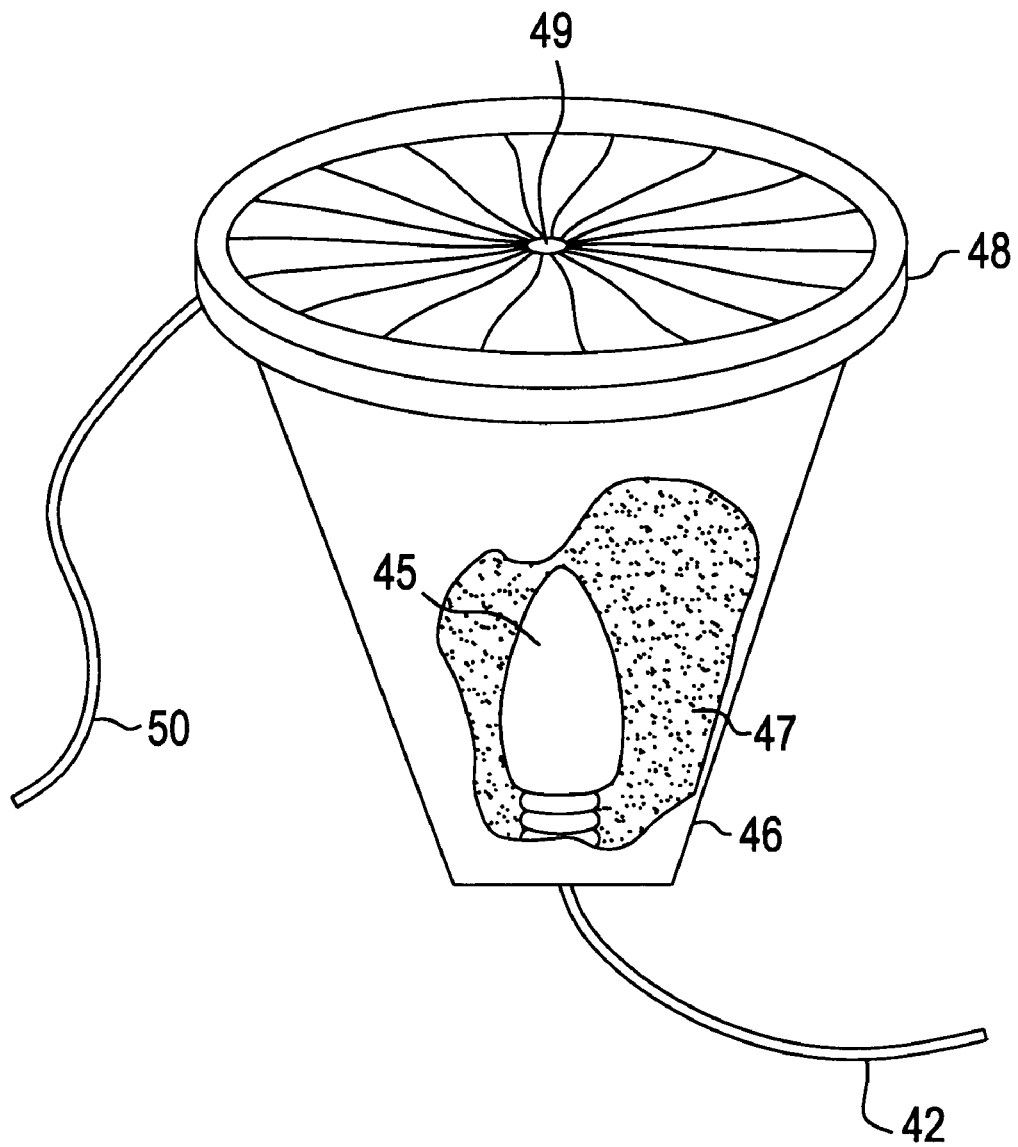
FIG. 4a shows an offset of the localized illumination light source of FIG. 3.

The focused light source 41, as shown in FIG. 4a, consists of a light bulb 45 enclosed in a cone 46 with reflective surface (mirror) 47 at the interior of the cone 46. A shutter mechanism 48, like the iris of a camera, encloses the front of the light source and allows a beam of light to shine through the opening 49. The shutter opening 49 is determined by the extent of the area to be highlighted and is controlled by a control signal received by cord 50 from the computer. The control signal affects the activation of a relay-spring arrangement (not shown) connected to the shutter.

Figure 4B:
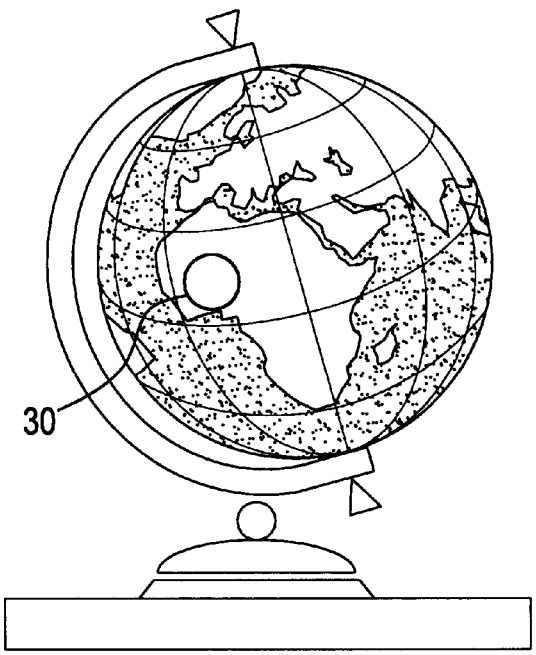
FIG. 4b shows selective area illumination of the light source shown in FIG. 3.
Figure 4C:
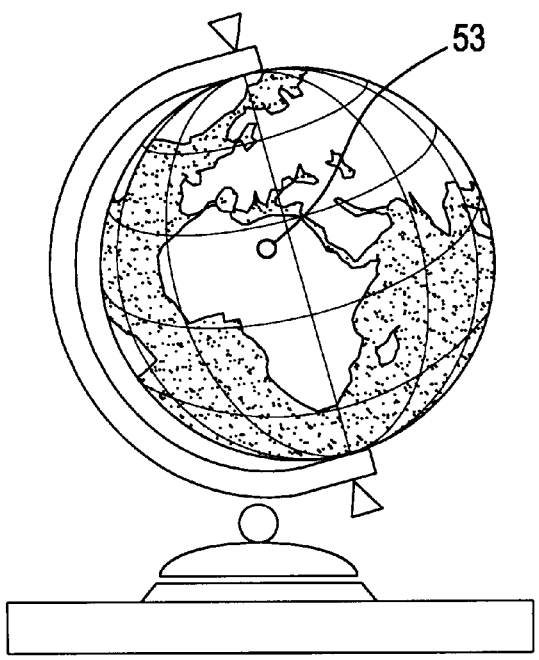
FIG. 4c shows the illumination of a spot on the physical globe using the light source shown in FIG. 3.

The light beam passing through the opening 49 is focused by a lens 51; shown in FIG. 3. The width of the focused light beam is dependent on whether the light source is to illuminate an area 52 as shown on the physical globe of FIG. 4b or to illuminate a point 53 as shown on the physical globe of FIG. 4c. The rotation of the light source and the control of the aperture of the shutter is common to the art of spot illumination of physical globes and the control of the aperture of the shutter is common to the art of automated photography. However, the timing of shutter opening is not fixed by a certain speed but continues until the user issues a command to change or turn off the highlighting light source (close the shutter).

Figure 5:
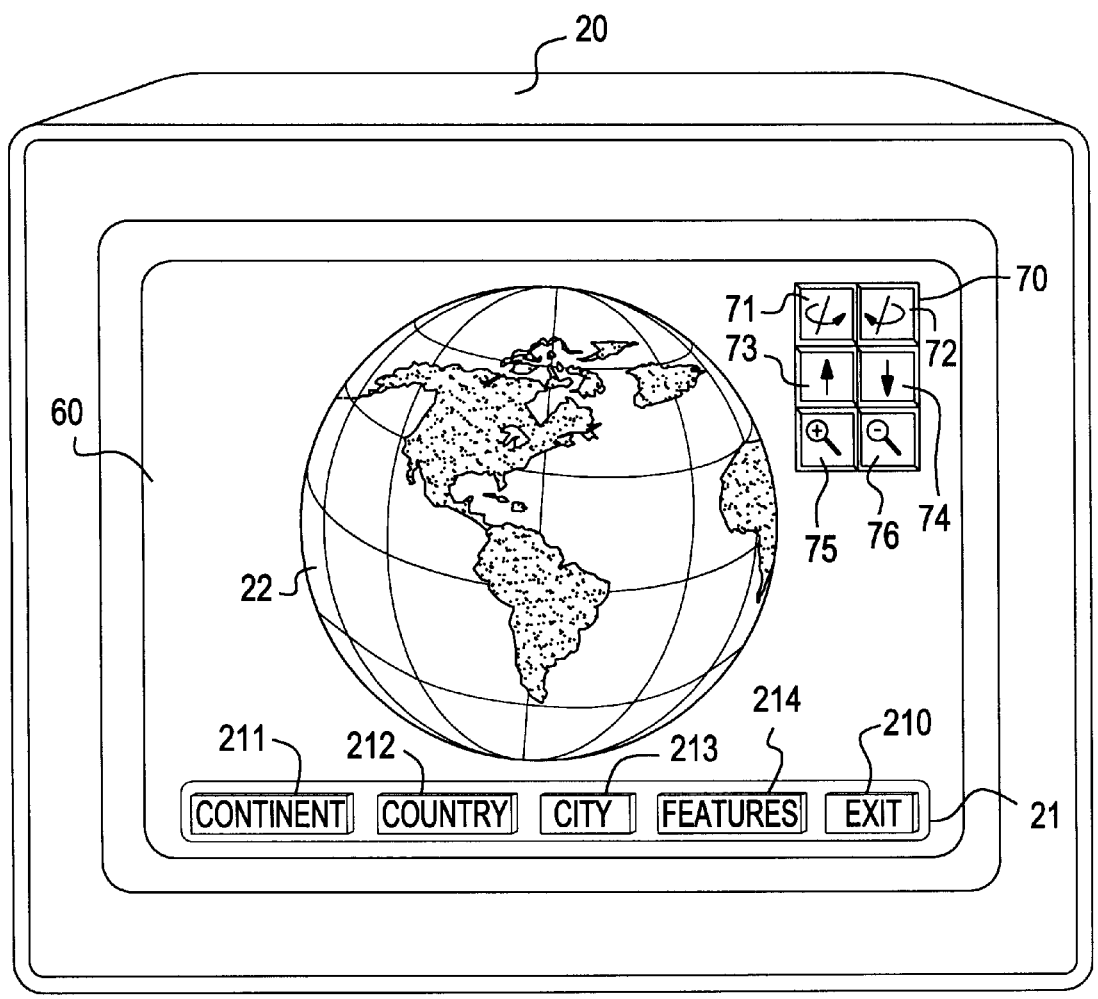
FIG. 5 illustrates an initial screen of the computer monitor showing the virtual globe model, control toolbox for viewing different aspects of the globe, and an example of a menu, including control pushbuttons for selection of display options of specified locations on the globe.

The user-interface display space 60 on the screen of the computer monitor 20 shown in FIG. 5 is partitioned such that the large portion of the screen is occupied by the display of the animated virtual globe 22, other graphic map displays, or relevant graphic or textual information. Other portions of the graphical user-interface display 60 are reserved for a "toolbox" 70 for manipulating the globe, and a menu pushbutton system 21.

The operation and application of this embodiment is best described in terms of displays on the computer monitor screen. However, all displays on the monitor 20, especially the actions of highlighting the virtual globe 22 are accompanied simultaneously with synchronous highlighting of the physical globe 30. The objective is to highlight the region of interest on the physical globe 30 all the time while the exploration of detailed maps and information are in progress using the virtual globe 22 or the associated detailed maps.

An initial main screen of the user interface display 60 is shown in FIG. 5. The toolbox 70 and the menu pushbutton system 21 are activated by a pointing input device such as the mouse 16 of FIG. 1.

By activating any of the six areas of the toolbox 70, of FIG. 5, the user can rotate the virtual globe left 71 or right 72, can pan up 73 or down 74, and can "zoom" in 75 or out 76 of the 3-dimensional virtual globe 22 revealing various levels of details. In addition, at higher detail levels the user can zoom in and out of specific two-dimensional maps of more specific locations in order to obtain even more detail than that provided by the three-dimensional virtual globe 22.

By activating any of the pushbuttons on the menu system 21, the user can enter control commands through EXIT pushbutton 210, a pushbutton 211 for direct "go to" functions for highlighting a CONTINENT, a pushbutton 212 for direct "go to" functions for highlighting a COUNTRY, a pushbutton 213 for direct "go to" functions for highlighting a CITY, and a pushbutton 214 for direct "go to" functions for highlighting geographical FEATURES, such as a geographical region or point of interest. A user interacting with the menu system 21 can automatically locate specific places or geographical features by name.

Additional buttons can be added to the menu system 21 within the limitation of space. Also, once the functions of a set of buttons on one menu are used, other menus can appear using the EXIT button 210 for change of menu.

All the functions available to the user through the toolbox or menu system can be accessed through any pointing, tactile, or voice input device providing the appropriate interface is available such as a touch screen for tactile input or a microphone and a voice recognition system for vocal input.

Figure 12:
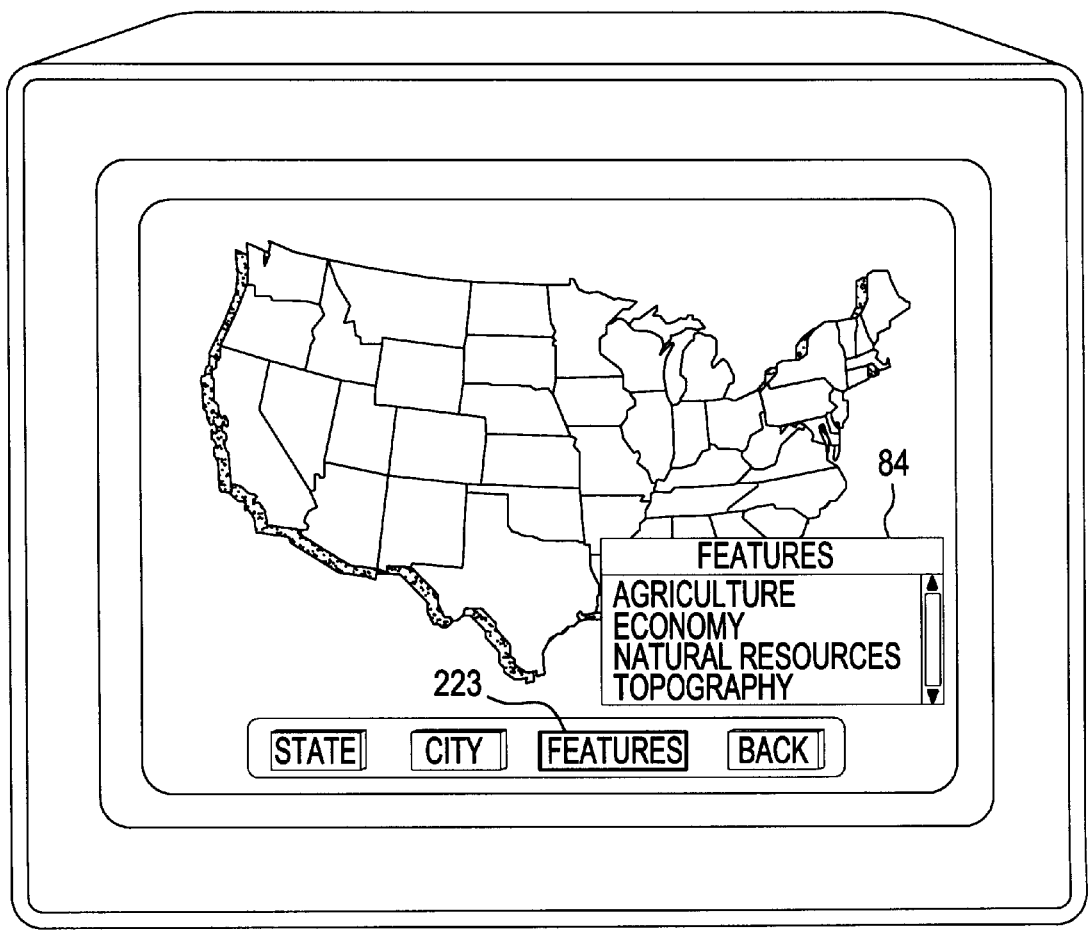
FIG. 12 illustrates the display on the screen of the computer monitor for selection of a topic from a "TOPICS" pop up list.

By activating one of the menu pushbuttons, a list box pops up showing choices with several options, making selection options less ambiguous. This is demonstrated in FIGS. 6, 8, and 12.

Figure 6:
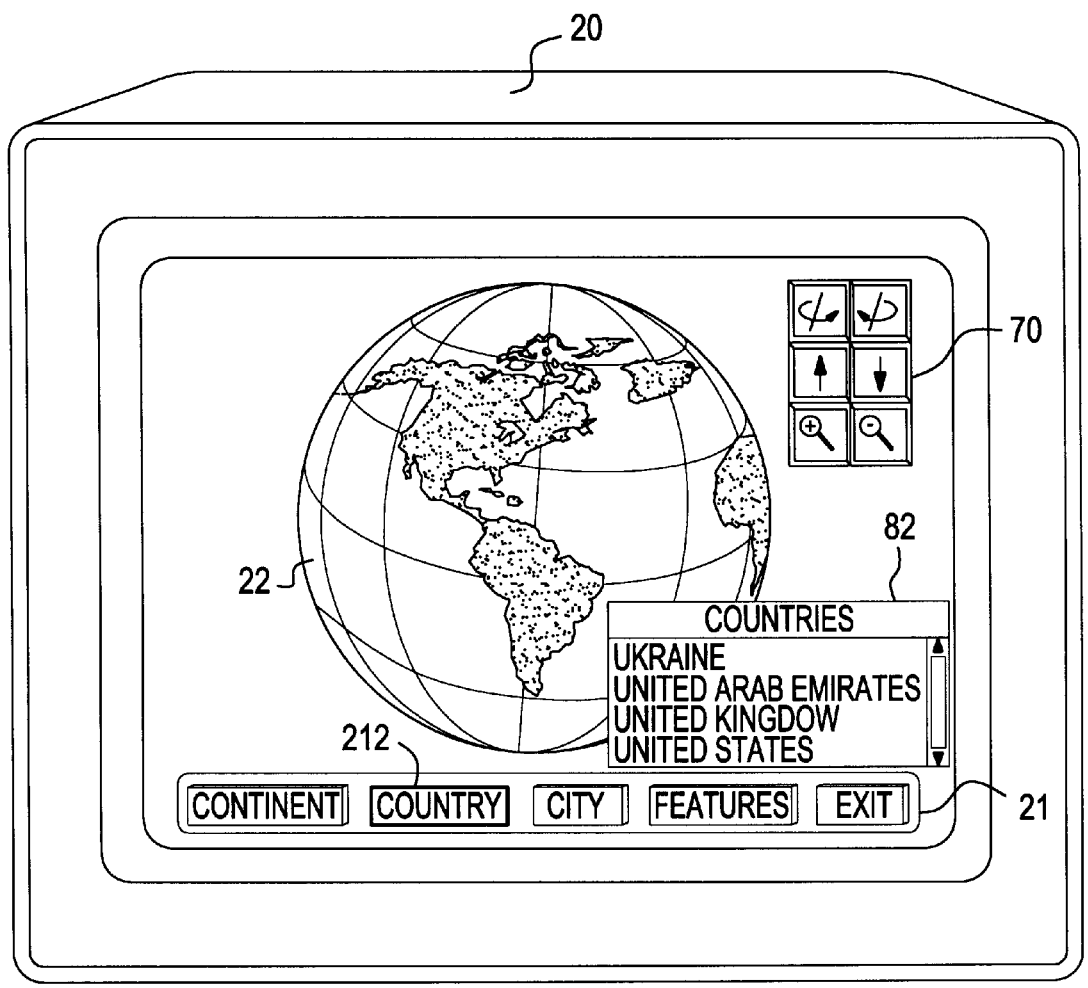
FIG. 6 illustrates the display on the screen of the computer monitor for selection of a country from a "COUNTRIES" pop up list.
Figure 7:
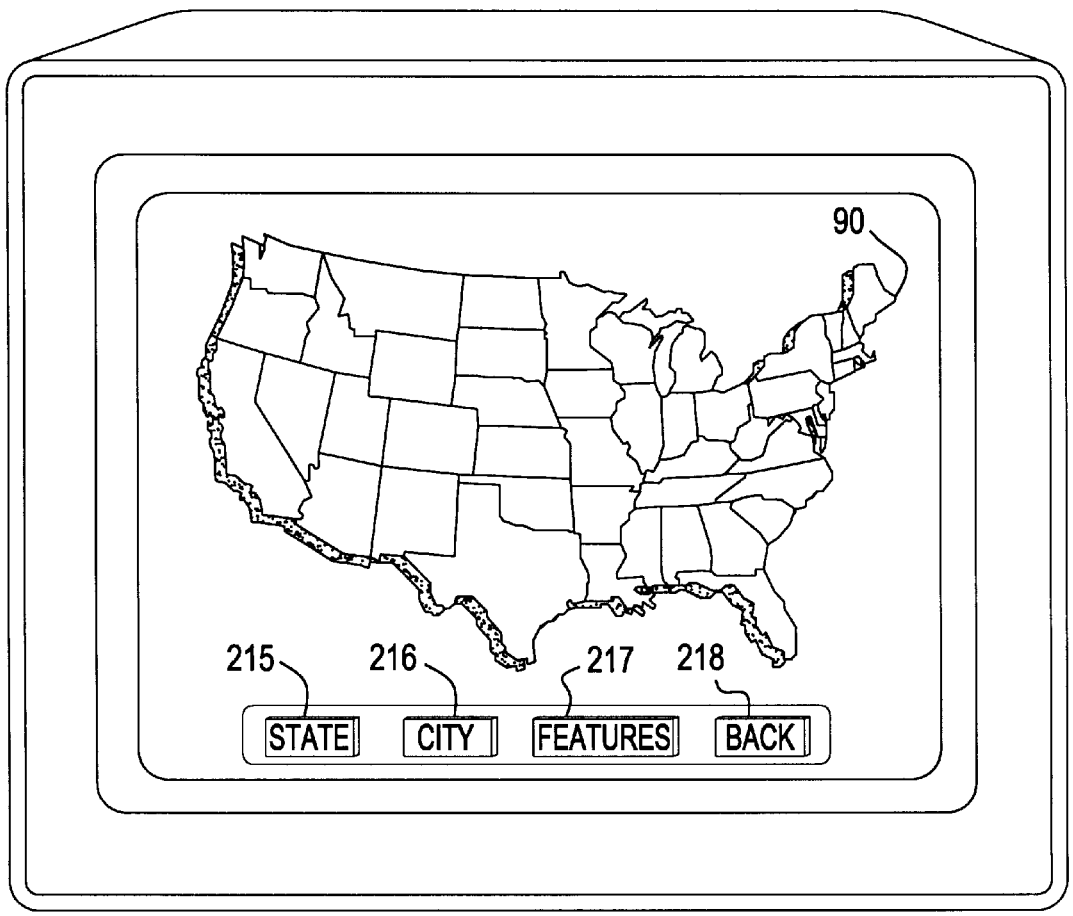
FIG. 7 shows the display following the selection of a country using the menu of the screen of FIG. 6.

In FIG. 6, a user wishing to locate a particular country activates the COUNTRY pushbutton 212, causing a COUNTRIES list box 82 to pop up on the screen to provide listing of possible choices for countries, as a visual aid to the user. If, for example, "United States" is chosen as the country of interest, the view of the virtual globe 22 rotates to center the United States of America in the screen and distinguish it either by highlighting the country or fading the remainder of the image. Simultaneously, the country of interest will be highlighted on the physical globe 30, of FIGS. 1 and 2. The highlighting of the physical globe 30 is synchronized with the highlighting of the virtual globe 22. Highlighting of the virtual globe 22 will be followed by display of the country map 90 as shown in FIG. 7 while the country is still highlighted on the physical globe 30.

At different zoom levels, a number of menu choices are available and additional menus can be added. When the country map 90 is displayed, the menu changes to include a STATE button 215 for selection of states, a CITY button 216 for selection of cities within the state, a FEATURE button 217 for selection of geographical features within the city or state, and BACK button 218 to activate command functions which would return the view to the previous detail level. The STATE button 215 would be replaced by other political divisions of a country if a country other than the USA is selected, for example a PROVINCE button is used if the selected country is Canada.

Figure 8:
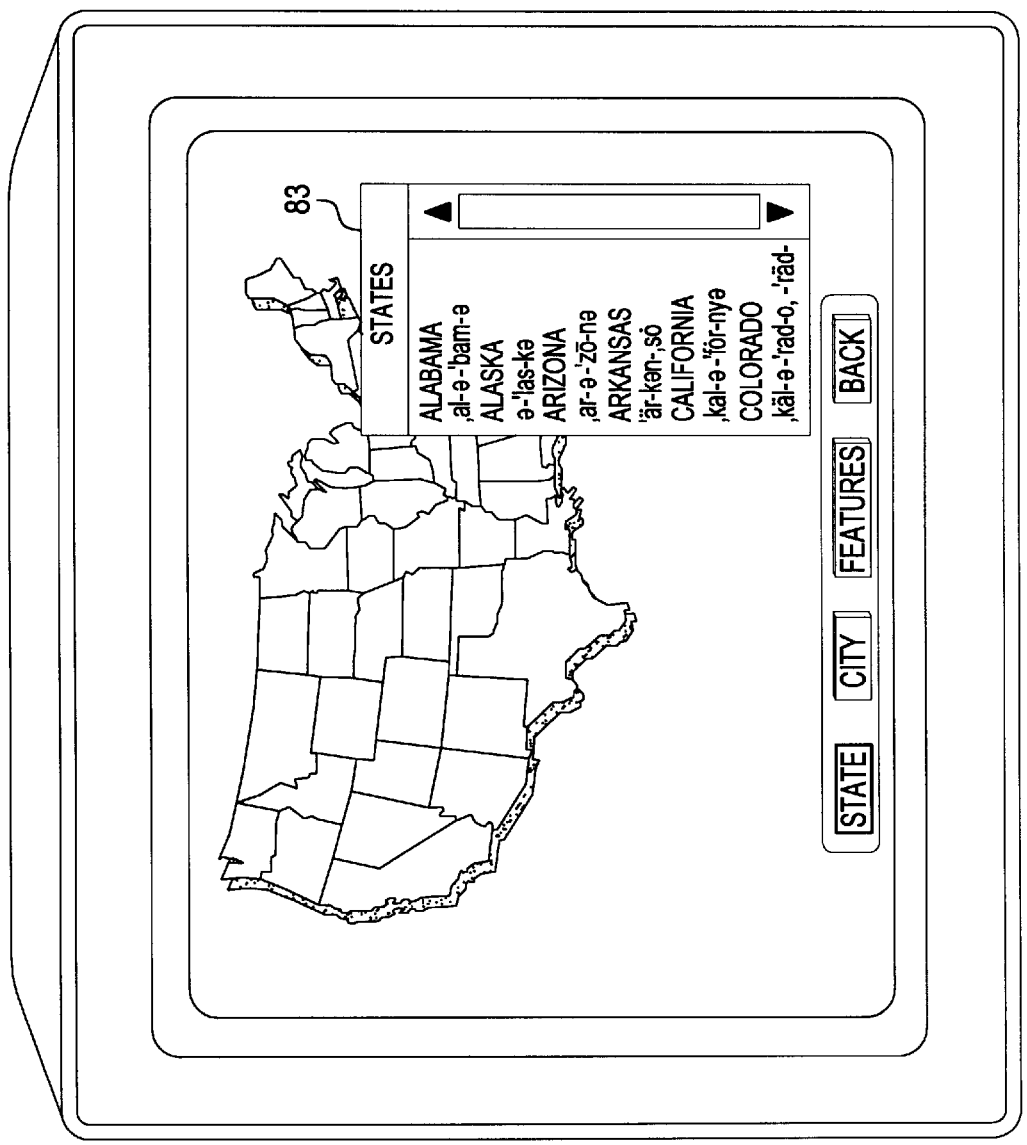
FIG. 8 illustrates the display on the screen of the computer monitor for selection of a state from a "STATES" pop up list.
Figure 9:
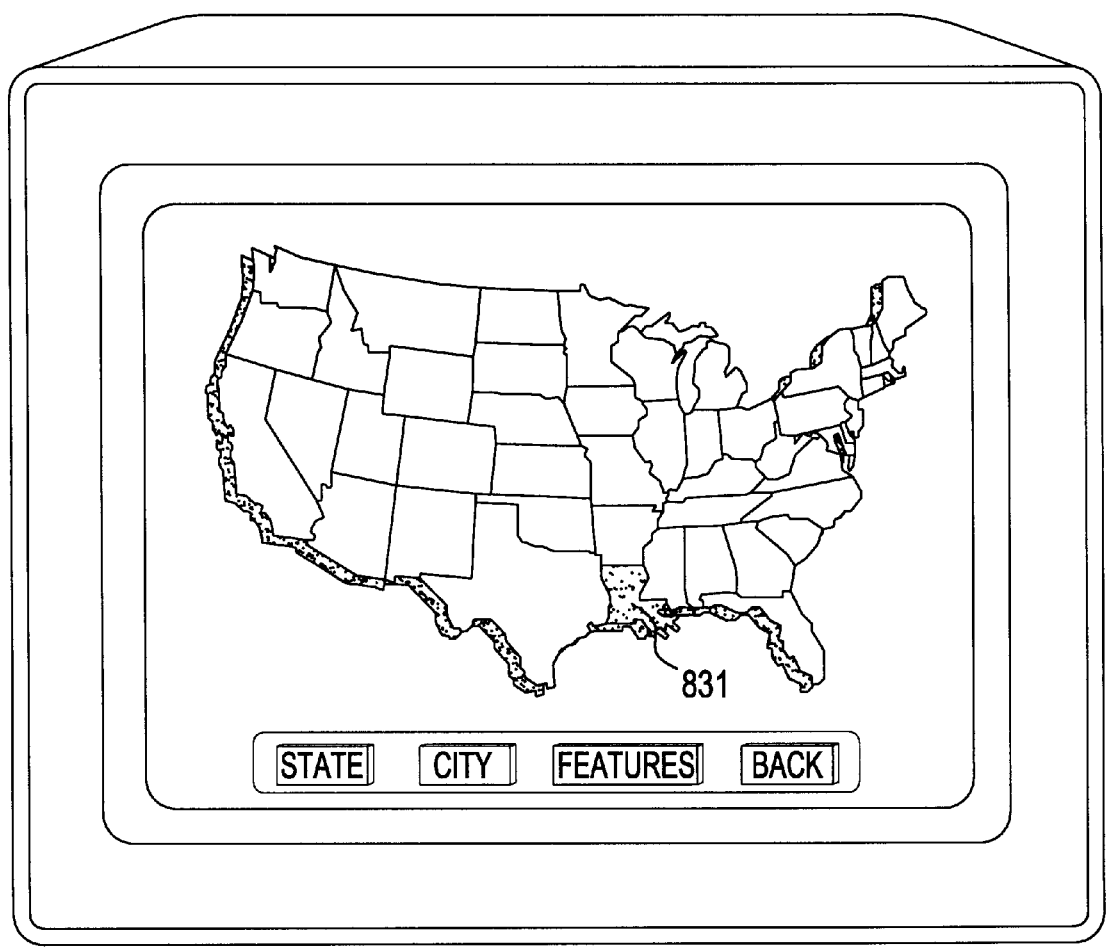
FIG. 9 shows the display following the selection of a state using the selection commands of the screen of FIG. 8.
Figure 10:
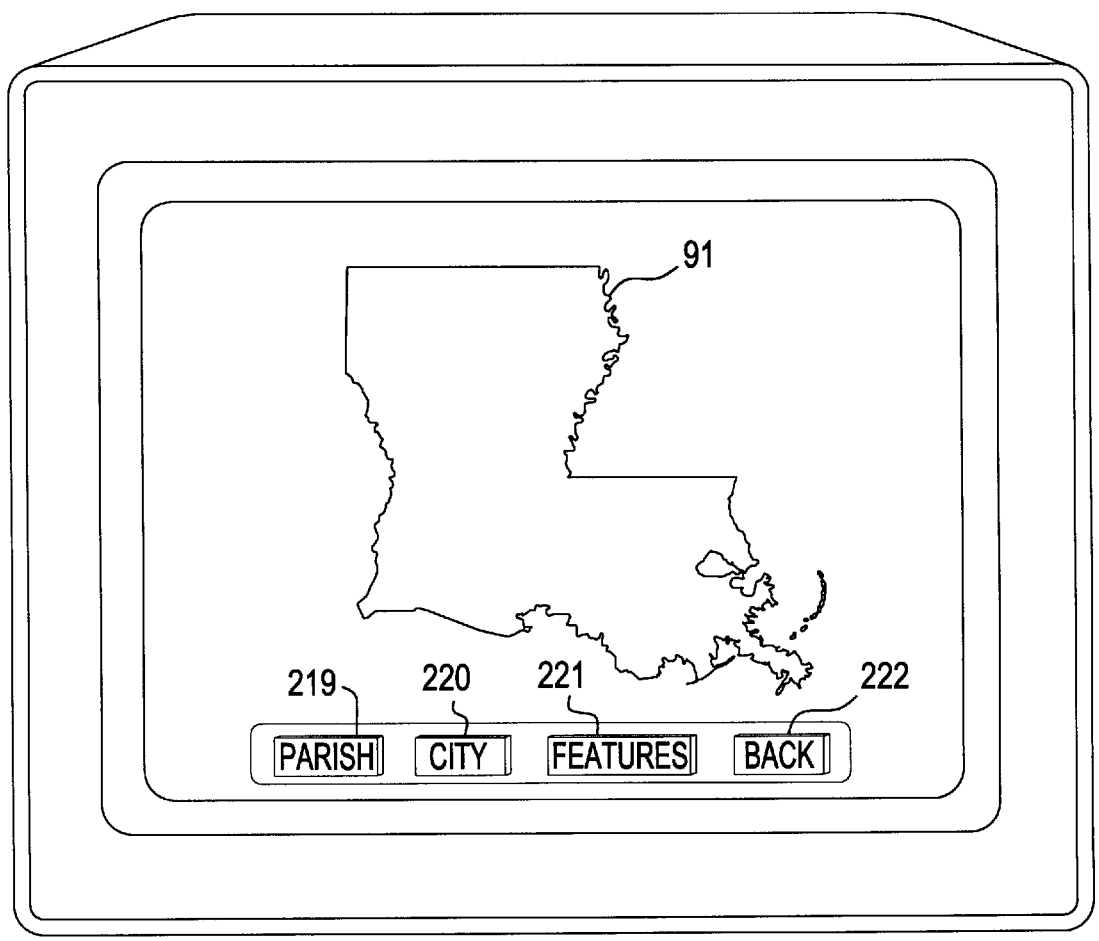
FIG. 10 shows the display of the state map following the selection of a state using the screen of FIG. 9.
Figure 11A:
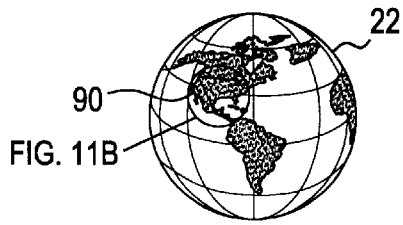
FIG. 11 depicts the zooming and panning aspects of the system and illustration of the generated maps and associated graphics and images.
Figure 11B:
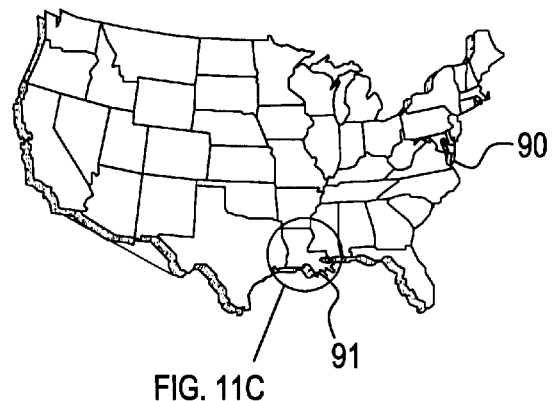
Figure 11C:
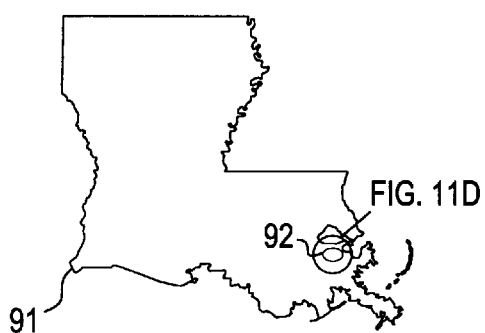
Figure 11D:
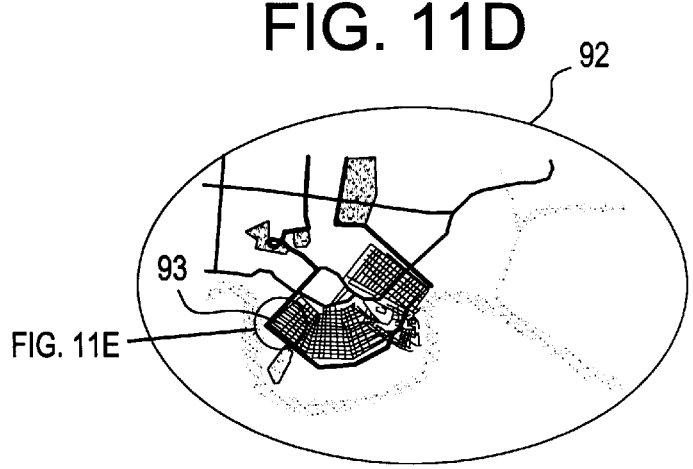
Figure 11E:
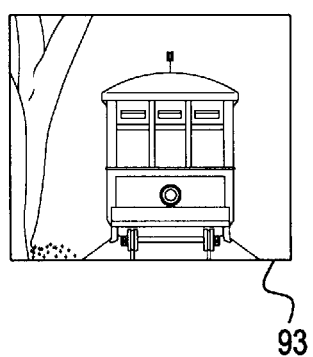

The process can be repeated at further levels. For example, if the user chooses a STATE from the options provided by the menu buttons, a list box of STATES names 83 appears to choose from, as shown in FIG. 8. The menu can include other desired criteria for each state such as the phonetic spelling of the state, as illustrated in FIG. 8. FIG. 9 shows the highlighting of the State of Louisiana 831, should Louisiana be selected from the state list box 83. This will be followed by displaying a map 91 of the selected state as shown in FIG. 10. Another change in the specifications of menu 21 will take place. The buttons will change to PARISH/COUNTY button 219 for selection of a parish, county or other type of region within the state, a CITY button 220 for selection of cities within the state, a FEATURE button 221 for selection of geographical features within the state, and BACK button 222 to activate command functions which would return the view to the previous detail level.

The zooming and panning aspects of the system are illustrated in FIG. 11 showing the generation of magnified maps and specified scenes through an example. FIG. 11 shows zooming from the overall world model 22 to focus on the United States 90, then to zoom in further to reveal the map highlighting the state of Louisiana 91, next to zoom in and focus on a map of New Orleans 92, and then to show images of particular attractions which pertain to Louisiana and New Orleans such as the streetcar 93.

It is important to note that one need not specify every step in the sequence to zoom in on a particular detail. For example, to zoom in on New Orleans, one need not specify that the view should go through a sequence from the global view, to the view of the United States, to Louisiana, and then to New Orleans. Instead, the user can specify New Orleans and the view would automatically begin zooming in until the required level of detail is achieved. A list of possibilities appears to choose from, in cases wherein more than one location exists for a given phrase or name, for example, Alexandria, Minn.; Alexandria, La.; Alexandria, Va.; and Alexandria, Egypt.

Figure 13:
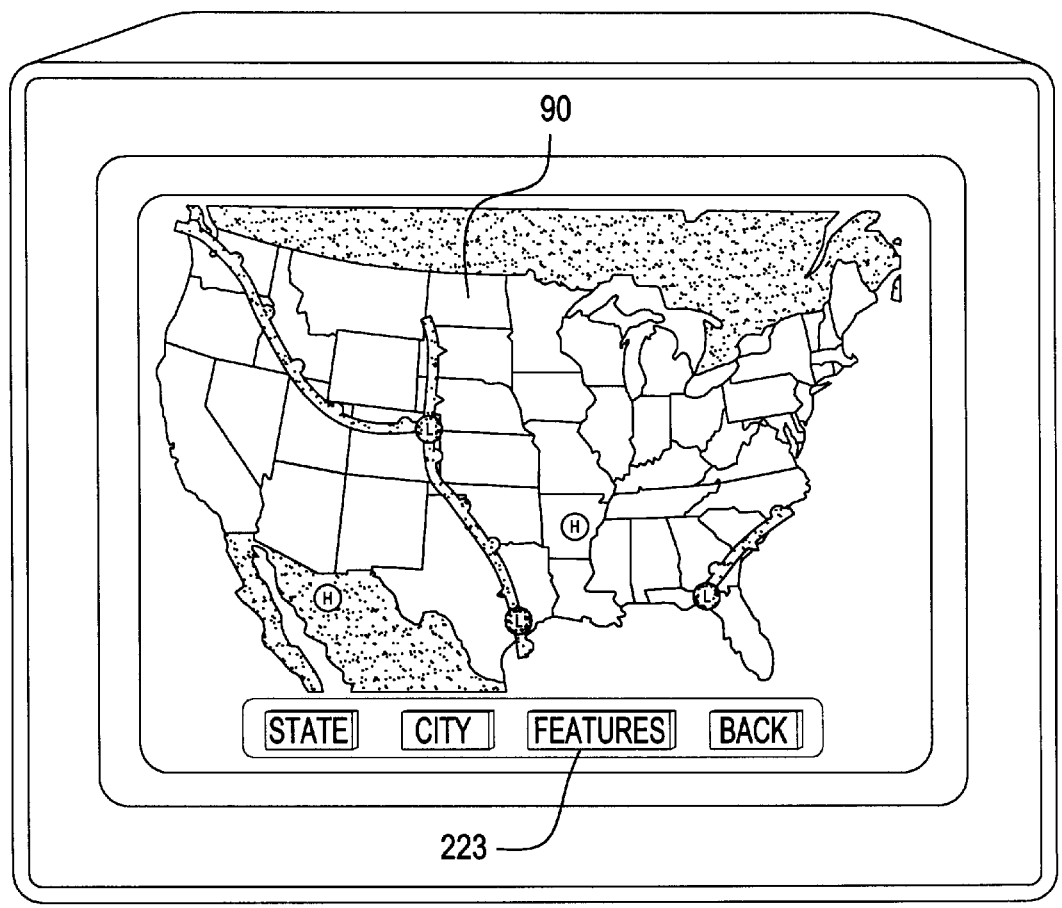
FIG. 13 shows the display following the selection of weather using the commands on the screen of FIG. 12.

Additional buttons are added to call other menus for exploring various aspects of geography. Upon activation of the FEATURE button 223 in FIG. 12, a FEATURE menu 84 pops up for selection of a field of interest related to a continent or a country. This can be part of an internal database and knowledge base or can be imported from external databases using modem 28 of FIG. 2. In the example of FIG. 13 a weather map 901 is selected.

The main software implementation required to run the system includes, geometric modeling for graphic simulation of a three-dimensional world globe and the for generated maps; software to integrate and coordinate the system's various components; and software to provide an efficient graphical user interface and is discussed in further detail with reference to FIG. 16. Some of the geographic maps and information can be imported from readily available multimedia libraries, databases, and knowledge bases stored on various input devices such as compact discs and floppy disks. Additional data can be accessed through the modem 28. Also, other users can access the geographic information through appropriate networks through the modem 28 to download files or for interactive use. This feature is important in distant learning and on self-paced learning which are gaining an increasing momentum as methods of knowledge acquisition. Accordingly, many national and international resources are becoming available for use by individuals having access to workstations.

Various input forms, input devices, and human-computer interface systems can be used with the embodiment described above. Input forms, other than pointing and tactile inputs include voice input of different commands. The control menus and toolboxes can take various shapes for compatibility with the input forms and devices introduced in the system.

Different output modes and additional output devices can be used. For example, video scenes may be displayed on a portion of the monitor or on an additional display screen for showing specific clips about an area of interest. Also, textual or illustrated information can be displayed in lieu of the maps or in addition to the maps using portions of the screen of the monitor. Furthermore, audio information may be provided to the user by means of voice synthesis or recorded messages related to the selected locations or features. Displayed maps and information may be printed by connecting a printer and or a plotter to the computer system.

Figure 14:
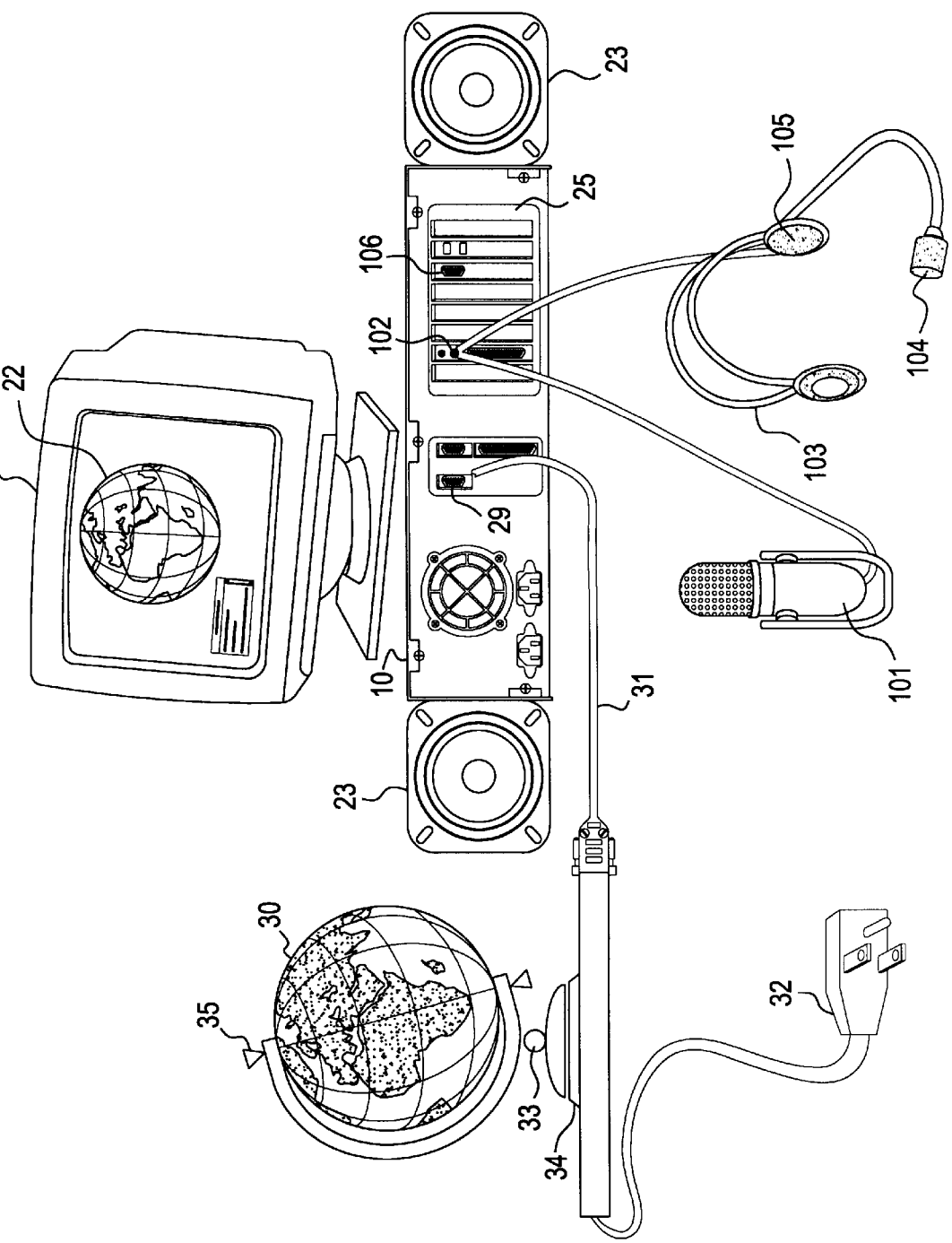
FIG. 14 is a simplified schematic representation of a voice-interactive aspect of the globe/geographic multimedia system showing various components of the system.

FIG. 14 shows a simplified schematic representation of a preferred embodiment of a voice-interactive globe/geographic multimedia system wherein input of operation commands and instruction is limited to voice input and all output of information is in the from of voice and display on the computer monitor 20 and/or other display devices such as a video screen.

The voice-interactive multimedia globe is developed using MacroMedia's Director which is a multimedia authoring platform. It simplifies the construction of the user interface and the coordination of the various elements in the application such as video, images, sound, and responses to user actions (in this case in response to voice commands, or mouse actions). Director applications are binary compatible with Macintosh computers. This means that an application developed for use on the PC platform can be run on the Macintosh family of computers.

The multimedia globe authored using Director communicates through Dynamic Link Libraries (DLLs) with the speech recognition software. The microphone input is polled to determine if a word is recognized. If the system matches a word to a predetermined vocabulary then it translates that word into commands which instruct the display to change accordingly to display the proper image. It also calls special drivers which tell the motors of the actual physic globe to turn to the proper position to highlight the place of interest with the light pointer.

In application of the multimedia globe/geographic system, the user interacts with the dynamic display. Through voice interaction, the image of the world changes by a combination of rotation and panning of the image, which makes it appear as though the user is changing their perspective of the globe; zooming, in which the scale of the image changes and the details change; and transitions, as new images are displayed to focus on specific details or attractions. The voice interaction occurs as the software interprets words and phrases spoken into the microphone by matching the sound patterns to those stored by the computer which makes up a vocabulary of identifiable words. Keywords or identifiers determine the nature of the reaction of the software. For example, a keyword such as "locate" would indicate that following words or phrases should denote locations which will be illustrated through graphics on the display and described through a combination of voice, sounds, and/or text on the system. Other human-computer interfaces can also be used, such as touchscreen interface, keyboard, or mouse actions Voice input to the processor 10 is through a microphone 101 connected to a sound card in slot 102. Alternatively, the mouthpiece 104, in a headset 103 connected to the processor 10, can be used. The processor is provided with A/D hardware and/or digital signal processing (DSP) hardware in slot 106 for digitizing and processing speech input as well as synthesizing and playing audio output (such as a Soundblaster or compatible add-on card or chips integrated with the system to provide sound capabilities). One or more speakers are connected to the processor for audio output, dependent on the type of sound profile desired. For stereo sound effect, two speakers 23 are used. The speakers can be a part of the headset 103 as the earpiece 105 in FIG. 14. Three-dimensional sound systems may be used, such as the Convolvotron developed by NASA Ames Research Center. Speech recognition is implemented through software (such as IBM's Continuous Speech Series platform or Lernout and Hauspie's Continuous Speech Recognition platform). Hardware implementation of speech recognition is readily available on computer boards, such as IntroVoice VI for PC and Micro IntroVoice for Apple MacIntosh available from Voice Connection, Irvine, Calif.

The main screen is accessed by voice commands spoken into a microphone 101 or 104 connected to a sound card in the host computer 10. The initial display on the monitor screen 20 is an animated three-dimensional image 22 of the earth map that rotates to show a place of interest and its relation to the other land masses and bodies of water that constitute the earth. To determine the location of a particular place, the user gives a verbal request which is interpreted by the speech recognition software and compared to a vocabulary of words. The software keys in on certain identifying phrases to begin searching, such as "Tell me about" or "Where is". It then matches the words following the identifier such as "Louisiana" or "India." If there is a match, the image of the globe rotates to center the desired location in the picture. This is accomplished by cycling through multiple frames of the earth shown from different views to give the illusion of rotation. After the particular location is displayed, pertinent information is given through digitized or synthesized voice. Further voice commands allow more detailed information to be obtained such as climate, terrain, and resources; or can return the globe to its original view to identify other locations spoken by the user.

In addition to the virtual graphic image of the earth map 22 displayed on the computer screen 20, an actual motorized globe 30 is connected to the computer 10 through a peripheral port 29. When the user requests information about a particular place, not only does the image of the earth on the computer screen rotate, but the globe connected to the computer rotates also. The location of the place of interest is highlighted by a light pointer located on the inside of the globe. The physical globe provides advantages such as a true perspective of the earth and free viewing of the entire surface, where the software generated images can provide increased resolution and accompanying images related to the place of interest to enhance the educational benefits of the system.

Figure 15:
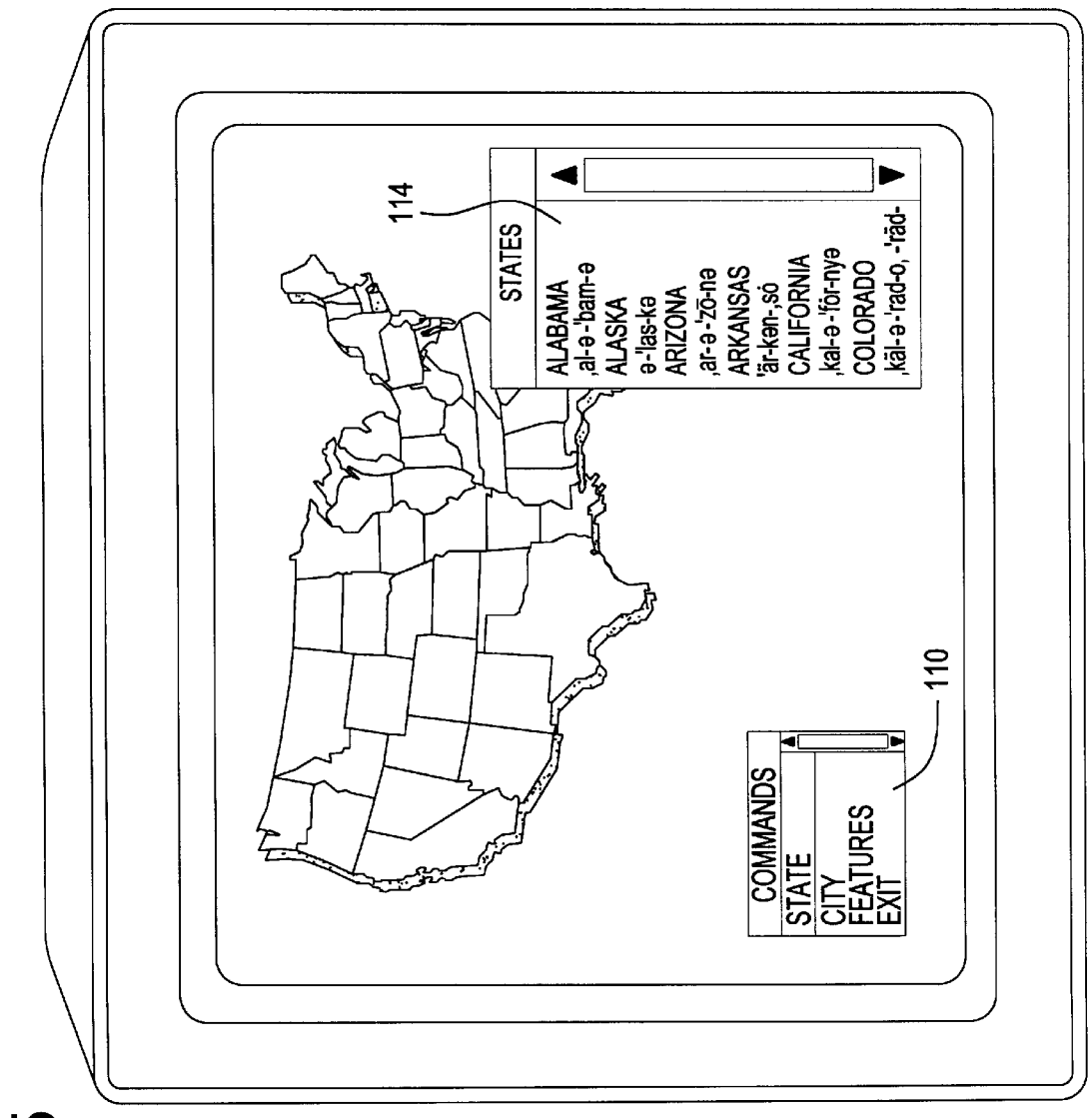
FIG. 15 shows a screen display of selection of a state with pop-up lists that act as guides in the voice interactive globe/geographic multimedia system shown in FIG. 14.

In the voice-interactive geographical system, no command menus or buttons are displayed on the screen. However, a list of optional commands 110 as that shown in FIG. 15 is displayed on the screen of the monitor as a guide for the user in selection of a state. As the user speaks the keyword on the command list the command for the associated function will be initiated. A list such as the "STATE" guide list 114 pops up for keywords including guide for pronunciation of the desired keyword. Other guide lists are available for continents, countries, cities, features, topics, etc.

The display on the voice-interactive globe consists of images and guide menus and list boxes. The menu items change depending on what is displayed on the screen. For example, the main screen contains the overall view of the globe with options for exiting, locating a particular place, zooming in on a particular place for more detail, or viewing attractions. The options need not be limited to these choices however.

In order to present the user with options of phrases and words to use, such as specific attraction for a given location, list boxes appear on the screen with the choices displayed. This is important to present options regarding places with which the user is not familiar with. For example, with respect to Louisiana and New Orleans, the options could include the Cabildo, Jackson Square, the French Quarter, the streetcar, and more. Speaking one of these phrases would cause the display to change to provide more detail and information.

The advantage of the guides is to limit the keywords and to provide concise voice commands. In this case, simple voice recognition systems can be used with relatively limited vocabulary. A voice interactive geographic system can be constructed using a more sophisticated speech recognition hardware or software that will allow commands without restriction. Unless the speech recognition system is absolutely speaker independent, training of the system by each user is necessary.

In the preferred embodiment of the voice interactive multimedia globe/geographic system, speech recognition capabilities are provided through IBM's Continuous Speech Series Developer's Toolkit and Run-Time System. This system provides for speech recognition through software with the use of popular sound cards such as Soundblaster or Pro Audio Spectrum. It is a speaker independent system that can recognize words spoken intelligibly by anyone without having to train the system to recognize the words for each user. This provides for a far more flexible system.

Figure 16A:
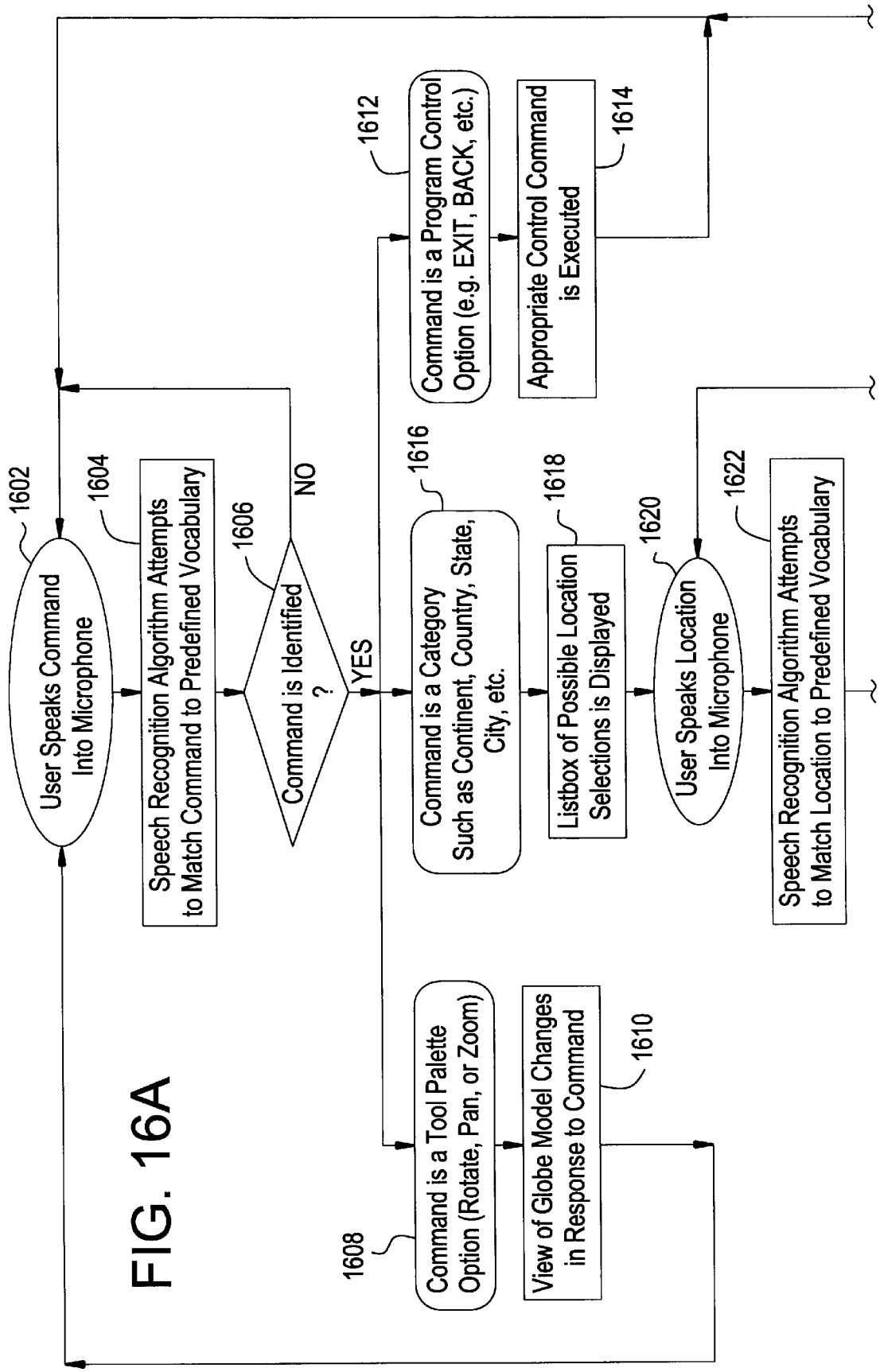
FIG. 16 is a flowchart of the operation of the voice interactive globe/geographic multimedia system shown in FIG. 14.
Figure 16B:
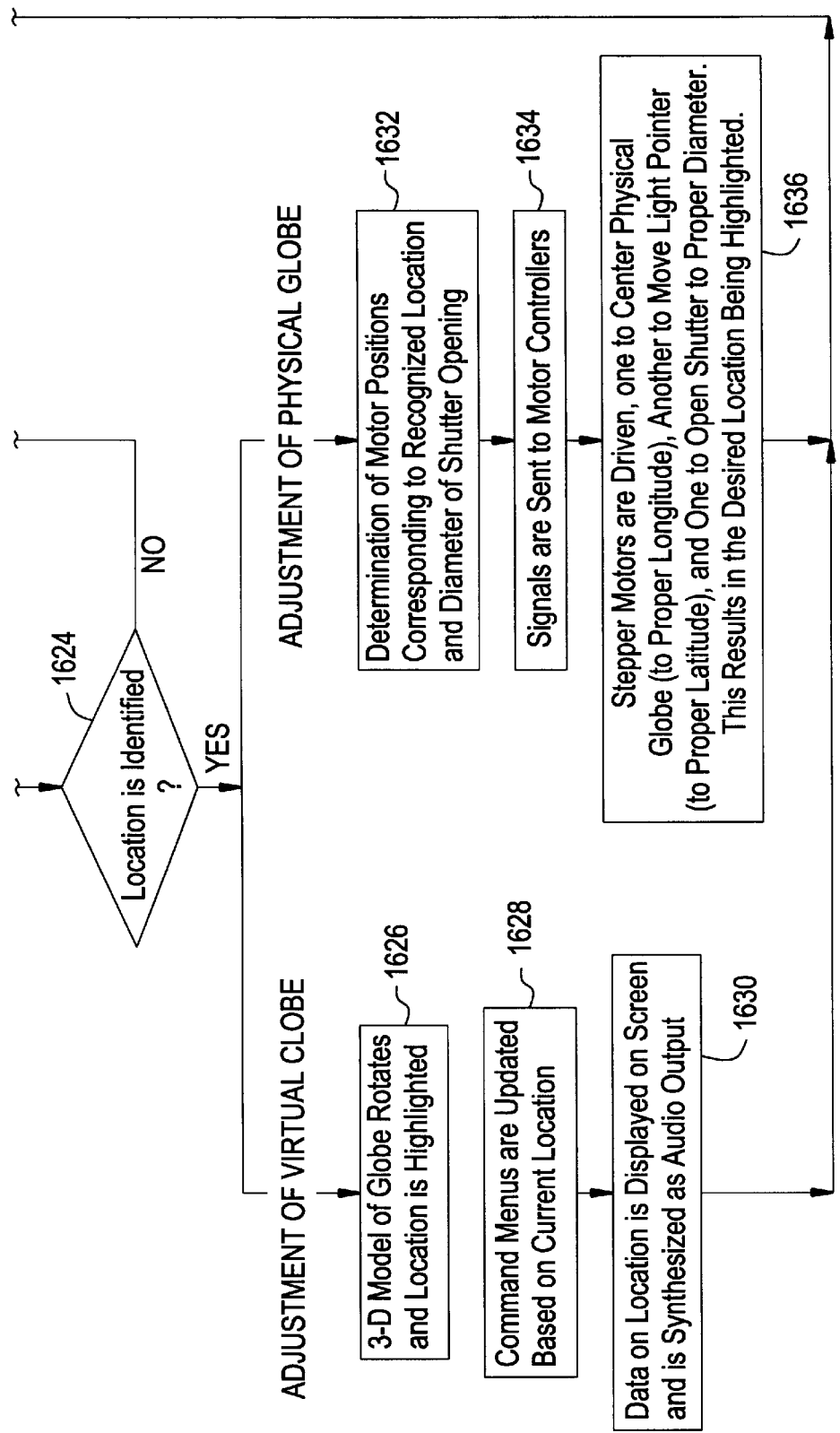

FIG. 16 shows a flowchart of the operation of the voice-interactive globe/geographic multimedia system. To start the operation, the three-dimensional image of the globe is displayed on the screen along with possible command options. The user chooses a command and speaks into the microphone the appropriate word or phrase related to such command, as illustrated in step 1602. If the speech recognition algorithm does not recognize the spoken word or phrase as a legitimate command, the user is prompted to say the command again, as shown in steps 1604 and 1606. The speech recognition algorithm may be any speech recognition software currently available to allow a user to interact vocally with a multimedia system to perform a series of predetermined functions. There are three possible types of commands which can be recognized, each of which is discussed below.

The first group of commands encompasses basic program control issues. The user speaks these commands to "exit" the program, go "back" to the previous screen, and so forth, as shown in steps 1612 and 1614.

The second category of commands is utilized when the user wants the globe to show a particular location. These commands are the titles of particular categories of locations, such as "continent", "country", "state", and "city," as shown in block 1616. When the user speaks this type of a command, a list box appears on the monitor showing all of the possible choices relating to that command. Thus, if the user were to say "country", a list box would appear which contained the name of every country in the world. After the listbox is displayed, the user now speaks the desired location from that listbox, as shown in step 1618. If the speech recognition algorithm does not recognize the spoken location, the user is prompted to say the name of the location again, as shown in step 1606. Otherwise, both the virtual globe and the physical globe are manipulated so as to show (and highlight) the requested location.

The last type of commands are the tool palette commands, these allow the user to directly control the virtual and physical globe in terms of zooming, rotating, and panning, as shown in step 1608. Thus, if the user says "rotate left", the virtual and physical globes rotate to the left, as illustrated in step 1610. These commands allow the user to view the globe from any angle without having to locate a specific place.

If the user's spoken keyword is recognized by the speech recognition software the software looks up the location in its database and the location is then translated to determine which images should be displayed on the monitor and what positions the stepper motors should occupy to highlight the place of interest, as indicated in steps 1620–1624. The corresponding images are displayed and pulses are sent through the computer's peripheral port; the voltage sent through the port is amplified by an amplifier so that the voltage is sufficient to drive the motorized globe; and the stepper motors turn the globe and move the light pointer to highlight the place of interest, as shown in steps 1632–1636. After the location is identified, more details can be revealed by voice requests. If more details are requested, then the physical globe remains at the place of interest to maintain a sense of where the place is located on the globe, while the image changes to display more detail.

The virtual globe also adjusts in 3-D to highlight a location selected by the user to allow the user to view her requested location on the computer screen or the physical globe, as shown in block 1626. As the user inputs voice commands, the command menus are updated based on the requested location, as illustrated in block 1628. The user is then able to view the location data on the computer screen and listen to a synthesized audio output which provides further data to the user, as shown in block 1630. If a new location is requested, then the entire process is repeated.

Figure 17:
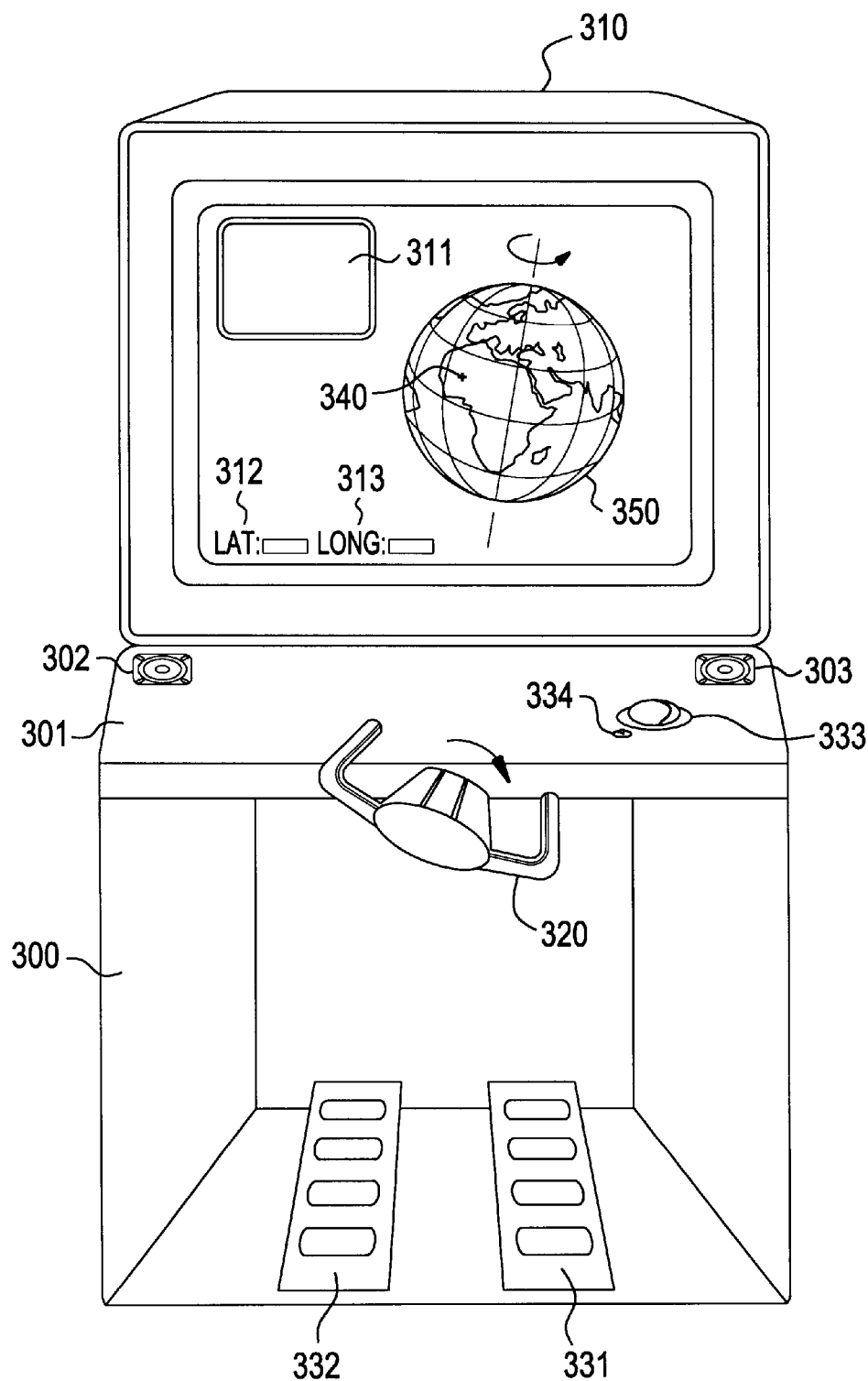
FIG. 17 shows a simplified schematic representation of navigation tools of a virtual geographic multimedia system for navigation through a globe or a map.

A schematic representation of another embodiment of the multimedia interactive globe/geographic system is shown in FIG. 17, wherein the navigation tools of a virtual geographic multimedia system are depicted for navigation through a globe or a map. The system is integrated on a console or a workstation 300 consisting of a workspace 301, a three-dimensional stereo monitor 310, connected to a processor (not shown). In this embodiment, the user input to the system is via a control yoke 320 with six degrees of freedom, footpedals 331 and 332, trackball 333 for moving a selection cursor 340 to select a point or region on the display and pushbutton 334 for selecting the point or the region by the selection cursor 340.

An animated three-dimensional model of a virtual world globe 350 and subsequent area maps are displayed on the monitor 310. A video display of a world globe is displayed in a dedicated window 311. A virtual world globe model may be used in place of the video display. In either case the world globe display in window 311 is used as a reference indicating selected regions of interest, while manipulating the virtual world globe 350 and displaying subsequent area maps on the monitor 310. The window 311 may also display additional information including text, video or other images. Furthermore, window 311 can be used to display video scenes associated with the selected geographic feature to provide visualization of the feature. This will provide the user with virtual presence at the selected location. Position gages 312 and 313 are provided on monitor 310 to indicate the location of the cursor on the map. Gage 312 shows degrees of latitude and gage 313 annunciates degrees of longitude. Also, a speed gage may be added. Two speakers 302 and 303 are provided on workspace 301 for voice output providing stereo presentation of display description and narration of the displays.

Figure 18A:
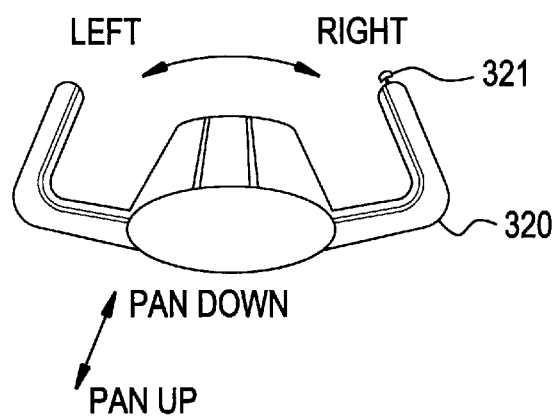
FIG. 18a illustrates the controls and direction of the motion of the steering yoke used as a navigation tool of the virtual geographic multimedia system of FIG. 17.
Figure 18B:
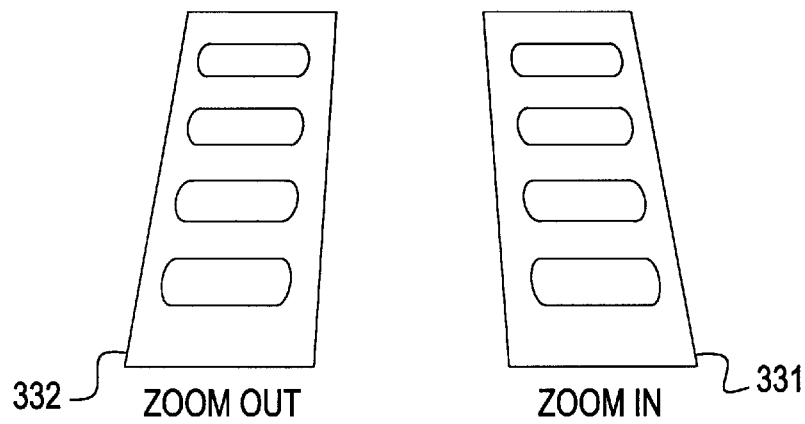
FIG. 18b illustrates the function of footpedals as shown in FIG. 17.
Figure 18C:
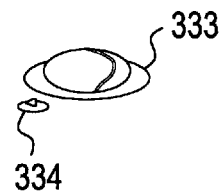
FIG. 18c illustrates the trackball as shown in FIG. 17.

FIG. 18*a* depicts the controls and direction of the motion of the steering yoke of a control configuration for the embodiment of the system shown in FIG. 17. The control yoke 320 has six degrees of freedom. By turning the control left or right, the image pans left or right. Similarly, by pushing the yoke forward, the image pans down; and by pulling the yoke outward, the image pans up. The yoke can be moved also up and down for adjustments. The detail or zoom level changes by pressing the footpedals as shown in FIG. 18*b* to zoom in 331 and zoom out 332. The trackball 333 and pushbutton 334 shown in FIG. 18*c* are one of many options for positioning a cursor on the display for selection of an area or place of interest for more information which might be presented visually on the display or by audio. Another option is to provide a control 321 on the yoke itself which would be used to direct the selection cursor in the same manner as the trackball.

All maneuvers are performed by the control yoke, the footpedals, the trackball and the cursor. This allows the user to move around the globe and select places of interest by using the cursor. Voice commands and speech recognition can still be used, if desired, to fully access all capabilities of the multimedia system.

Figure 19:
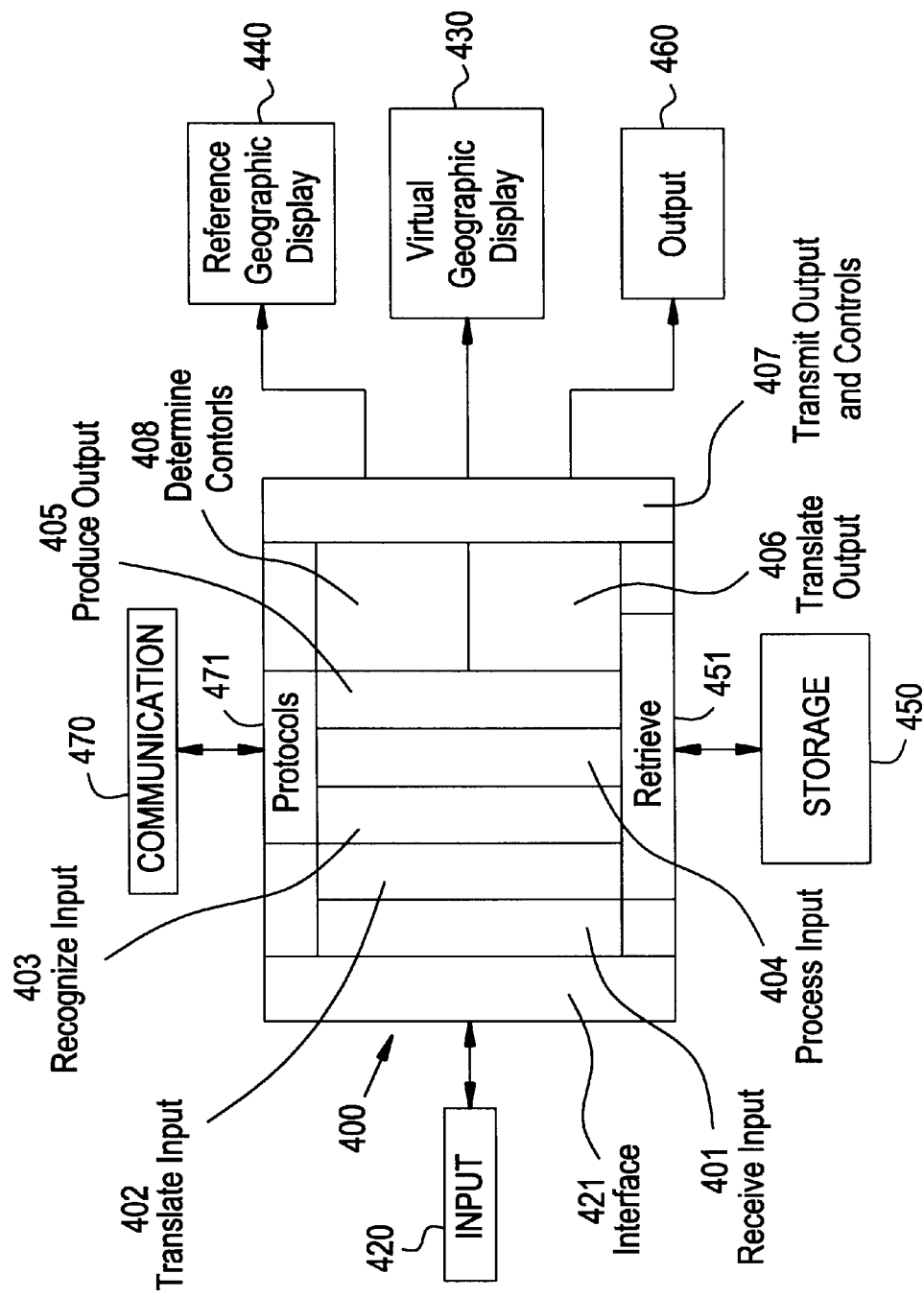
FIG. 19 is a schematic block diagram of an interactive multimedia system showing components and process flow from users' request of information and queries (input) to output and displays of information.

FIG. 19 shows a schematic of a directed system block diagram depicting the general configuration of the system and the flow of the process events. Input device 420 provides users with direct access to the system. The user starts a session by activating one or more of a variety of input devices 420 which may include voice or speech; push of a button or touch; sign, pointing or motion; movement of eye lashes, eye pupils or head; manipulating a navigation device; or writing or drafting. The input device 420 can be any or a combination of a microphone; a pointing device; navigation device; braking device; magic glove; lightpen; touchscreen; lightpen; light beam; keyboard or graphic tablet.

Activation of the system activates an interactive interface 421 which receives inputs for transmission as input signals to the processor 400, and provide graphical interfaces in the form of active menus and toolboxes (which can be activated by touch, fixing the position of a cursor, or direct pointing by a pointing device), or passive guide lists and position indicators for the users to specify operating protocols, select operating commands, choose a keyword for highlighting a geographic feature for direct viewing on the virtual geographic display 430 and the reference geographic display 440, or animate and manipulate the displays 430 and 440, or navigate through the virtual geographic display 430. Also, the interactive interface 421 provides the users with a feedback stimulus in response to input actions. The feedback stimulus can be in the form of display of text or graphics on the monitor of a computer or other forms of response to an input action. Processor 400 may be the same as that used in computer platform 10 as described above with reference to FIG. 1.

When users enter data, a request, a query, operating instructions or a command in the form of activating graphic interfaces or an alphanumeric input through the input device 420, the processor 400 receives an input signal 401, convert the input signal, as shown in block 402, into a form compatible with the processor 400 by an analog-digital converter, for example. The translated input signals has to be recognized by the operating system of the processor 400, as shown in block 403. If recognized, the signal is processed, in block 404, by the operation protocols of processor 400. The recognition includes the use of databases stored in storage component 450. The storage 450 stores multimedia information including graphics, text, data, images, operation protocols, databases and keywords, etc. Stored information is retrieved for processing input signals and for formatting output and control signals 451. The processor 400 produces output signals 405 which may include direct output or control signals. Direct output signals are translated into appropriate output formats 406, for example digital-analog conversion for printers, plotters or display monitors or voice synthesis for voice output. Translated direct output signals are then transmitted through 407 to output devices 460. Produced control output signals are processed to design controls 408. Control actions are then transmitted by 407 to affect control actions for animation, highlighting, synchronization of the animation and highlighting of displays 430 and 440. Also control actions may be transmitted to affect play of recorded narration on an audio player and synchronization of the audio player with the displays 430 and 440.

Communication between the geographic system and other workstations is provided by a communication system 470 which includes a fast speed modem appropriate for transmission of multimedia information, connected through intercommunication channels such as telephone lines with remotely located sites. Communication protocols 471 allows the processor to retrieve data from databases on remote sites for storage in the storage 450, for display 430 on computer monitor, or for processing of input signals 404. Also, information on the storage 450, or display 430 can be remoted to similar systems located at remote sites through communication network 470.

Those with ordinary skill in the art will readily derive alternate and different embodiments as well as modifications on the preferred and the numerous embodiments described here of the interactive geographic/globe multimedia invention which are within the scope of the invention defined by the appended claims. For example, but not by way of limitation, the above invention is equally applicable to navigational maps, celestial maps, and topological maps. Also, the invention may be used to develop an anatomical information system for acquisition of knowledge on particular organs or functions of the human body within the context of the whole body functions.

What is claimed:

1. An information system for interactive access to geographic information using visual and interactive multimedia representation to retrieve global data, comprising:

memory means for storing multimedia geographic information and a plurality of identifying attributes;

input means for interfacing with users for receiving operating instructions specifying queries concerning specified geographic features, multimedia geographic information and identifying data, said input means connected with said memory means for storing data inputted by a user;

output means for presenting multimedia geographic information and specified geographic features stored in said memory means to said users simultaneously in three-dimensional and two-dimensional formats using a virtual display means for displaying geographical information on a monitor and a physical display means for displaying a geographic world map, said virtual display means and said physical display means operatively synchronized to output said multimedia geographic information in unison; and processing means including an interactive interface means connected to said memory means, said input means, and said output means for receiving input signals from said input means, invoking specified protocols, and generating control signals to operatively control said information system to respond to signals received from said input means, accessing said memory means to retrieve information requested by a user through said input means, and determining the mode of presenting said information requested by a user to said user via said output means, said interactive interface means comprises graphical interface means for annunciating operating commands, identifying keywords and animating tools and invoking associated operating protocol, said graphical interface means comprising operating command buttons for specifying predetermined geographic features, identifying keyword lists for listing identifying keywords identifying corresponding said multimedia geographic information and said specified geographic features, and animation toolbox for selecting manipulation options to manipulate and animate multimedia geographic maps and said physical display means.

2. The system of claim 1 further comprising a communication means for communicating with a remote processing means and accessing remote memory means located at remote locations, said communications means connected to said memory means for accessing and storing information sent and received by said communications means.

3. The system of claim 1 wherein said output means includes a voice output means for narrating said multimedia geographic information and vocally describing said specified geographic features.

4. The system of claim 1 wherein said processing means includes a retrieval means for retrieving said multimedia geographic information and said identifying attributes from said memory means.

5. The system of claim 1 wherein said output means further comprises production means for documenting said multimedia geographic information.

6. The system of claim 1 wherein said operating command buttons are associated with categories of said predetermined geographic features, said categories represent different levels of details of geographic regions and subregions within political boundaries on said multimedia geographic maps, activating said operating command button invokes an associated operating protocol for displaying of corresponding category of said predetermined geographic feature, prompting the display of an associated said identifying keyword list for specifying said predetermined geographic feature for displaying and highlighting said specified geographic features on said multimedia geographic maps and highlighting said specified geographic features on said physical display means.

7. The system of claim 1 wherein said animation toolbox includes a plurality of manipulation options for manipulating and animating said virtual display means, said animation control means comprising:

animated rotation toolbox for rotating said virtual world globe and said multimedia regional maps about the longitudinal coordinate axis and the latitudinal coordinate axis and rotating said physical display means about the longitudinal coordinate axis to expose hidden specified geographic features for direct viewing;

animated panning toolbox for moving said virtual world globe or said multimedia regional maps up and down on said virtual display means; and animated zooming toolbox for zooming in to enlarge and reveal more details of said specified geographic features and suppress background geographic features, zooming out to change scale of said specified geographic features.

8. The system of claim 1 wherein said physical display means includes a physical world globe comprising a translucent spherical hollow shell, with the exterior of said shell displaying a rendering of a detailed said geographic world map and the interior of said shell being illuminated by a plurality of rotating light means rotating about the latitudinal axis, said rotating light means comprises dispersed light means for shining light on the interior light means comprises dispersed light means for shining light on the interior of said shell for illuminating the whole exterior of said shell and focussed light means for highlighting said specified geographic features, said focussed light means comprising:

directional illuminating means for generating concentrated light beams;

light enclosure means for enclosing said directional illumination means, reflecting said concentrated light beams in the forward direction, said light enclosure means having an interior surface and exterior surface, wherein said interior surface covered with a reflective mirror lining for reflecting said concentrated light beams, and said exterior surface is opaque, and said enclosure means having an opening facing the said directional illuminating means for passing the said concentrated light beams out of the said light enclosure means;

light collimating means for collimating the said concentrated light beams leaving the said light enclosure means, said light collimating means is connected with said highlighting control means for controlling and adjusting the width of the collimated directed concentrated light beams; and light focussing means for focusing the collimated light beams for highlighting said specified geographic features on said world globe, said light focussing means is rigidly attached to said light enclosure means.

9. The system of claim 6 wherein highlighting of said specified geographic features on said multimedia geographic maps distinguishes between said specified features and said background geographic features on said for contrasting said specified features from light shades of said background geographic features.

10. The system of claim 9 wherein highlighting is in different colors combining red, green and blue for distinguishing said specified features from said background geographic features on said multimedia geographic maps.

11. The system of claim 1 wherein said interactive interface means further comprises a text interface means that receives input from an alphanumeric input means for entering said geographic data associated with said predetermined geographic features and said multimedia geographic maps and queries about said specified geographic features, said multimedia geographic information and said identifiers.

12. The system of claim 1 wherein said graphical interface means receives signals from said input means, said input means comprises pointing input means for activating said specified operating protocols.

13. The system of claim 1 wherein said input means is voice input means for activating said graphical interface means following voice input recognition by said processing means.

14. The system of claim 1 wherein said graphical interface means interfacing directly with said users and receives input as a touch to a touchscreen on said computer monitor screen.

* * * * *